United States Patent
Kayama et al.

(10) Patent No.: US 9,344,266 B2
(45) Date of Patent: May 17, 2016

(54) TRANSMISSION SYSTEM, TRANSMISSION APPARATUS, AND CLOCK SYNCHRONIZATION METHOD

(71) Applicant: FUJITSU LIMITED, Kawasaki-shi, Kanagawa (JP)

(72) Inventors: Ryuji Kayama, Chikusei (JP); Hiroyuki Suzuki, Utsunomiya (JP); Takashi Nakano, Oyama (JP); Nobuyuki Kobayashi, Kiryu (JP); Akira Nozawa, Oyama (JP); Koji Suda, Tochigi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/613,443

(22) Filed: Feb. 4, 2015

(65) Prior Publication Data

US 2015/0280897 A1 Oct. 1, 2015

(30) Foreign Application Priority Data

Mar. 27, 2014 (JP) ................................ 2014-067222

(51) Int. Cl.
*H04L 7/00* (2006.01)
*H03K 27/00* (2006.01)

(52) U.S. Cl.
CPC .................................... *H04L 7/0016* (2013.01)

(58) Field of Classification Search
USPC ......... 375/354, 356, 358, 316, 295, 340, 342, 375/324, 293
See application file for complete search history.

(56) References Cited

U.S. PATENT DOCUMENTS

| | | | | |
|---|---|---|---|---|
| 7,620,409 | B2 * | 11/2009 | Budampati et al. | 455/502 |
| 2013/0077659 | A1 * | 3/2013 | Okuda | H04J 3/0667 375/219 |
| 2013/0272292 | A1 * | 10/2013 | Hunter | 370/338 |
| 2014/0314073 | A1 * | 10/2014 | Sugimoto | H04W 28/18 370/350 |
| 2014/0314417 | A1 * | 10/2014 | Leigh | H04L 41/12 398/79 |

FOREIGN PATENT DOCUMENTS

| | | |
|---|---|---|
| JP | 10-336224 | 12/1998 |
| JP | 2004-32175 | 1/2004 |
| JP | 2010-213176 | 9/2010 |

* cited by examiner

*Primary Examiner* — Linda Wong
(74) *Attorney, Agent, or Firm* — Staas & Halsey LLP

(57) ABSTRACT

A transmission system includes: a first transmission apparatus to distribute a synchronization clock; and one or more second transmission apparatuses each to connect to the first transmission apparatus so as to synchronize with the synchronization clock from the first transmission apparatus, the second transmission apparatus including: a selection portion to select the first or second transmission apparatus of a connection destination so as to switch the synchronization clock; an output portion to generate an inquiry signal addressed to the first transmission apparatus via the second transmission apparatus of the connection destination selected; a determination portion to determine whether or not the inquiry signal generated by the second transmission apparatus is received; and a second control portion to determine that there is a synchronization clock loop having a loop path through the second transmission apparatus of the connection destination when the determination portion receives the inquiry signal.

11 Claims, 23 Drawing Sheets

| BIT PATTERN (1 – 4) | CONTENT | BIT PATTERN (5 – 8) | CONTENT |
|---|---|---|---|
| 0, 0, 0, 0 | MASTER RESPONSE | 0, 0, 0, 0 | UNUSED |
| 0, 0, 0, 1 | NE ID1 | 0, 0, 0, 1 | 1 NODE |
| 0, 0, 1, 0 | NE ID2 | 0, 0, 1, 0 | 2 NODE |
| 0, 0, 1, 1 | NE ID3 | 0, 0, 1, 1 | 3 NODE |
| ⋮ | ⋮ | ⋮ | ⋮ |
| 0, 1, 1, 0 | NE ID6 | 0, 1, 1, 0 | 6 NODE |
| 0, 1, 1, 1 | UNUSED | 0, 1, 1, 1 | 7 NODE |
| 1, 0, 0, 0 | PRELIMINARY CONFIRMATION RESPONSE | 1, 0, 0, 0 | UNUSED |
| 1, 0, 0, 1 | NE1 PRELIMINARY CONFIRMATION | ⋮ | UNUSED |
| ⋮ | ⋮ | ⋮ | UNUSED |
| 1, 1, 1, 0 | NE6 PRELIMINARY CONFIRMATION | 1, 1, 1, 0 | UNUSED |
| 1, 1, 1, 1 | UNUSED | 1, 1, 1, 1 | UNUSED |

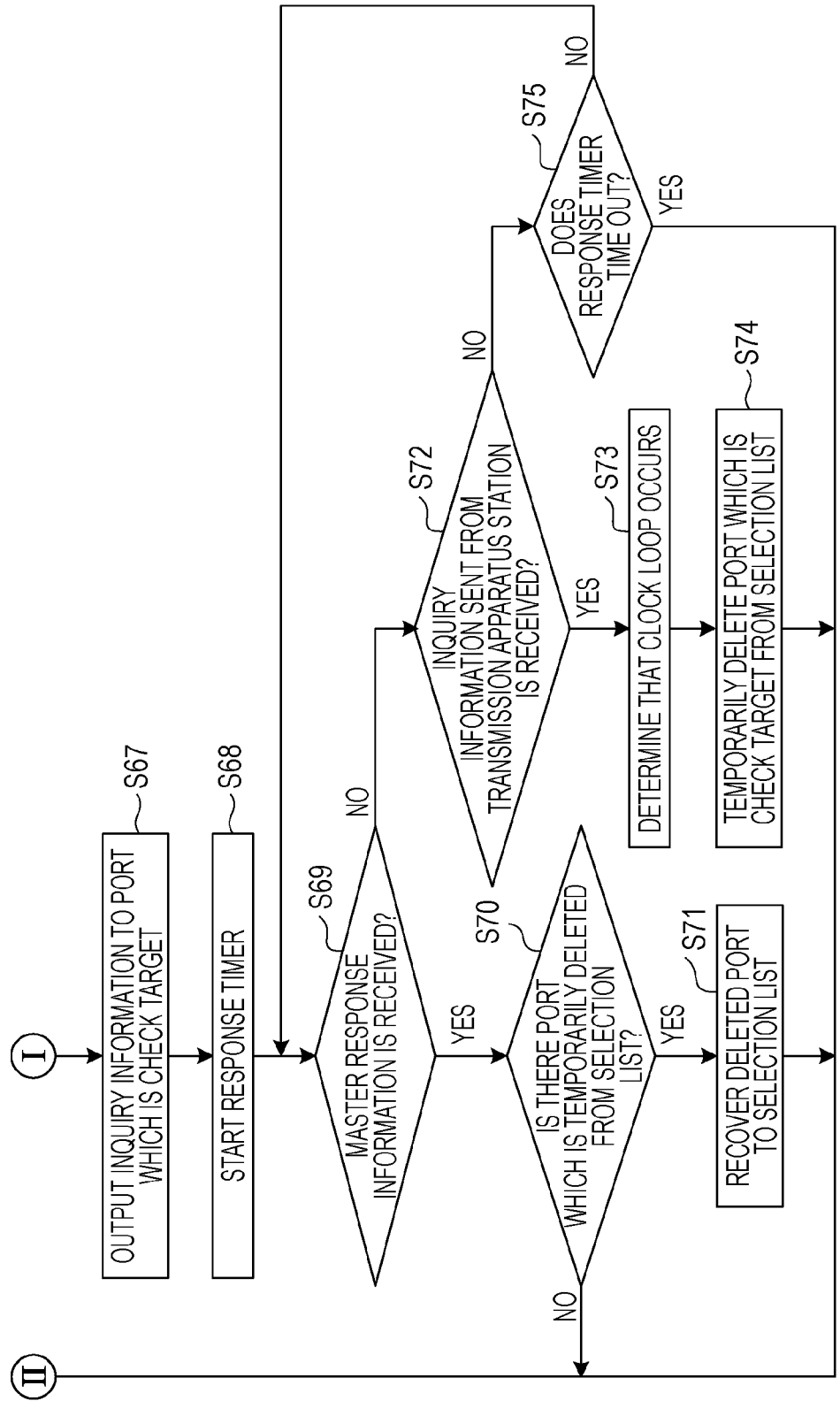

TRANSMISSION SYSTEM, TRANSMISSION APPARATUS, AND CLOCK SYNCHRONIZATION METHOD

CROSS-REFERENCE TO RELATED APPLICATION

This application is based upon and claims the benefit of priority of the prior Japanese Patent Application No. 2014-067222, filed on Mar. 27, 2014, the entire contents of which are incorporated herein by reference.

FIELD

The embodiment discussed herein is related to a transmission system, a transmission apparatus, and a clock synchronization method.

BACKGROUND

In recent years, as a transmission system in which a plurality of transmission apparatuses are connected to each other, for example, there is not only a linear type and a ring type but also a mesh type. The transmission system includes a master station provided with a transmission apparatus which distributes a clock for synchronization (synchronization clock) from a clock source, and a slave station provided with a transmission apparatus which is subordinately synchronized with the synchronization clock from the master station and performs each operation based on the subordinately synchronized clock. In addition, in the transmission system of the master slave synchronization type, in order not to cause an unneeded clock variation, generally, a line switched due to a line failure is not switched back when recovered from the failure.

However, in the transmission system of the master slave synchronization type, in a case where a line failure occurs between the master station and the slave station, each slave station may not receive the synchronization clock from the master station, and may receive, as a synchronization clock, a clock which is synchronized with a clock output from the slave station when the synchronization clock is recovered. Therefore, a synchronization clock loop may occur. In the transmission system, in a case where the synchronization clock loop occurs, a frequency difference of a synchronization clock of each transmission apparatus increases, and thus communication quality between the transmission apparatuses deteriorates.

As a method of minimizing the occurrence of the synchronization clock loop, there is a method of using an extended SSM as an extension of a synchronization status message (SSM) which is defined in International Telecommunication Union (ITU-T) G.707 and G.704. The SSM is a message for transmitting quality of a synchronous network timing reference.

For example, in a case where the extended SSM is used in a ring type transmission system in which clocks are supplied between transmission apparatuses, a transmission apparatus inserts an ID for identifying the transmission apparatus into the extended SSM in a transmission signal, and transmits the signal into which the ID is inserted, to other transmission apparatuses. In addition, each transmission apparatus determines whether or not an ID extracted from the extended SSM in a transmitted signal received from other transmission apparatuses is the same as an ID thereof. The transmission apparatus determines that a synchronization clock loop occurs in a case where the ID in the extended SSM is the same as the ID thereof. In the ring type transmission system, it is possible to check whether or not a clock loop occurs.

Japanese Laid-open Patent Publication No. 2004-032175 is an example of the related art.

SUMMARY

According to an aspect of the invention, a transmission system includes: a first transmission apparatus configured to distribute a synchronization clock, the first transmission apparatus including: a first control portion configured to select a clock source or second transmission apparatus of a connection destination so as to switch the synchronization clock, and generate a response signal to an inquiry signal; and one or more second transmission apparatuses each configured to connect to the first transmission apparatus so as to synchronize with the synchronization clock from the first transmission apparatus, the second transmission apparatus including: a selection portion configured to select the first or second transmission apparatus of a connection destination so as to switch the synchronization clock; an output portion configured to generate the inquiry signal addressed to the first transmission apparatus via the second transmission apparatus of the connection destination selected by the selection portion; a determination portion configured to determine whether or not the inquiry signal generated by the second transmission apparatus is received; and a second control portion configured to determine that there is a synchronization clock loop having a loop path through the second transmission apparatus of the connection destination when the determination portion receives the inquiry signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 20A and 20B are flowcharts illustrating an example of a process operation of the transmission apparatus related to a pre-check process;

DESCRIPTION OF EMBODIMENT

For example, in a transmission system of a mesh type in which a plurality of transmission apparatuses may be connected to each transmission apparatus, paths for selecting a synchronization clock of transmission apparatuses which are connection destinations are various, and thus it is hard to check whether or not a synchronization clock loop occurs. As a result, in the mesh type transmission system, quality of a synchronization clock signal deteriorates.

Hereinafter, with reference to the drawings, detailed description will be made of Examples of a transmission system, a transmission apparatus, and a clock synchronization method, capable of minimizing deterioration in quality of a synchronization clock signal even in the mesh type transmission system. The disclosed technique is not limited by the present example. The respective Examples described below may be combined with each other as appropriate within the scope in which conflict therebetween is not caused.

EXAMPLES

Figure 1:
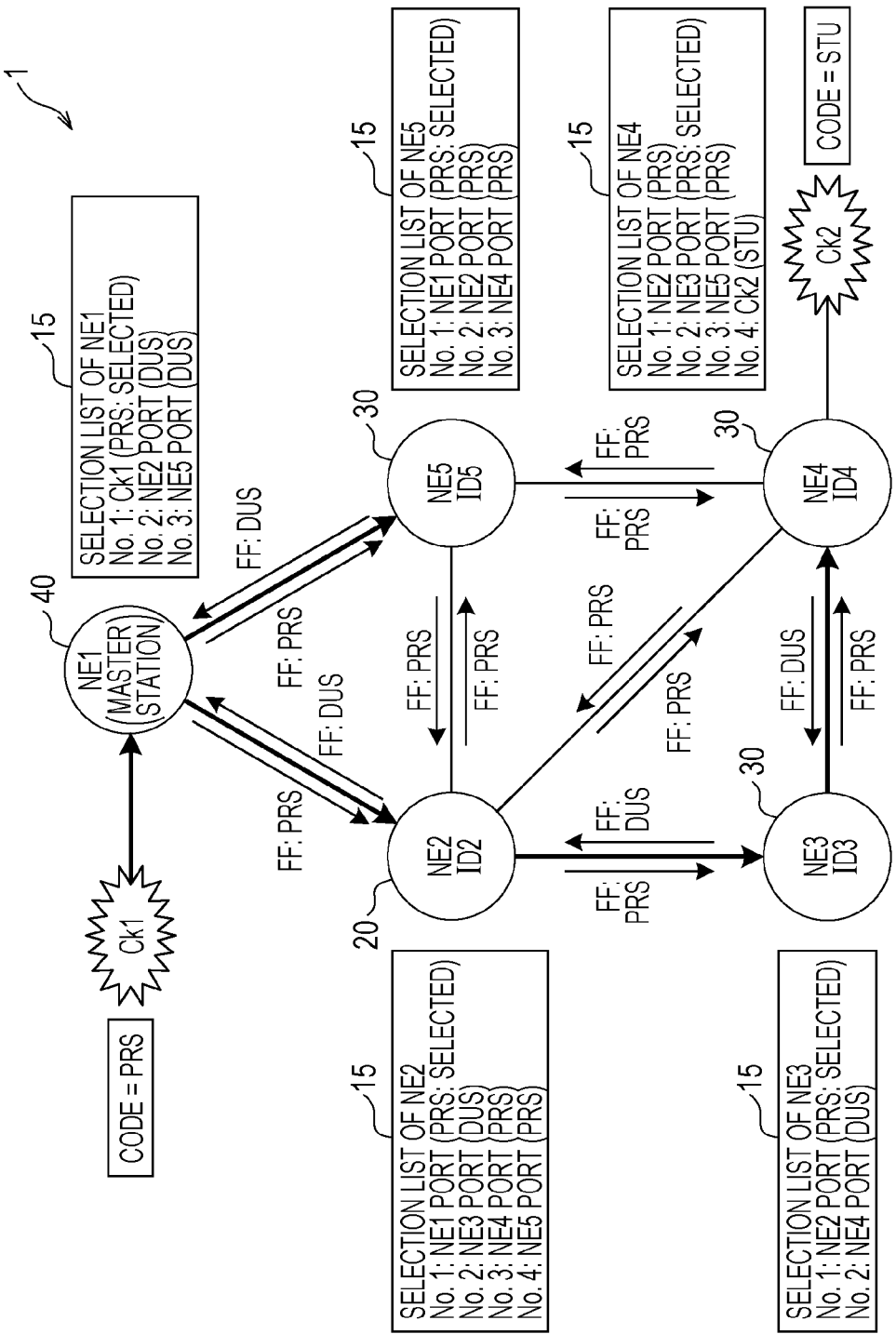
FIG. 1 is a diagram illustrating an example of a transmission system of the present example.

FIG. 1 is a diagram illustrating an example of a transmission system of the present example. A transmission system 1 illustrated in FIG. 1 is a communication network such as Synchronous Optical Network/Synchronous Digital Hierarchy (Sonet/SDH) of a master slave synchronization type, and includes, for example, transmission apparatuses NE1 to NE5, and clock sources Ck1 and Ck2 as external clock sources. The transmission apparatuses NE1 to NE5 have a mesh type connection configuration. The first transmission apparatus NE1 is connected to the second transmission apparatus NE2, the fifth transmission apparatus NE5, and the first clock source Ck1. The second transmission apparatus NE2 is connected to the first transmission apparatus NE1, the third transmission apparatus NE3, the fourth transmission apparatus NE4, and the fifth transmission apparatus NE5. The third transmission apparatus NE3 is connected to the second transmission apparatus NE2 and the fourth transmission apparatus NE4. The fourth transmission apparatus NE4 is connected to the second transmission apparatus NE2, the third transmission apparatus NE3, the fifth transmission apparatus NE5, and the second clock source Ck2. The fifth transmission apparatus NE5 is connected to the first transmission apparatus NE1, the second transmission apparatus NE2, and the fourth transmission apparatus NE4.

The first transmission apparatus NE1 is included in a master station 40 which is synchronized with a clock from the first clock source Ck1 in the transmission system 1 and distributes the clock to the respective transmission apparatuses NE2 to NE5 in the transmission system 1. The second transmission apparatus NE2 is subordinately synchronized with the clock from the first transmission apparatus NE1. The third transmission apparatus NE3 is subordinately synchronized with a clock from the second transmission apparatus NE2. The fourth transmission apparatus NE4 is subordinately synchronized with a clock from the third transmission apparatus NE3. The fifth transmission apparatus NE5 is subordinately synchronized with a clock from the first transmission apparatus NE1. The second transmission apparatus NE2, the third transmission apparatus NE3, and the fourth transmission apparatus NE4 are subordinately synchronized with clocks obtained via transmission signals from connection destination ports indicated by ends the arrows.

Each of the transmission apparatuses NE1 to NE5 has a selection list 15 in which identifiers of connection destination ports selectable when a clock is switched are stored, and an SSM set to each of the connection destination ports is stored therein for priority order. In addition, the SSM is a code indicating clock quality which is inserted into an S1 byte region of an overhead of a transmission signal. The quality code (quality level code: QL code) includes, for example, Primary Reference Source (PRS), Synchronization Traceability Unknown (STU), Stratum 3 (ST3), Do Not Use Synchronous (DUS), and the like in a descending order of quality. For example, PRS corresponds to the quality level 1, STU corresponds to the quality level 2, ST3 corresponds to the quality level 4, and DUS corresponds to the quality level 9.

For example, in a case where the first transmission apparatus NE1 is included in the master station 40 which provides a clock to the second transmission apparatus NE2, the first transmission apparatus NE1 inserts "PRS" into the S1 byte region of a signal which is transmitted to the second transmission apparatus NE2. The second transmission apparatus NE2 extracts "PRS" from the S1 byte region of the transmitted signal, and sets "PRS" for a connection destination port of the first transmission apparatus NE1 in the selection list 15. On the other hand, the second transmission apparatus NE2 which sets "PRS" inserts "DUS" into the S1 byte region of a signal which is transmitted to the first transmission apparatus NE1. The first transmission apparatus NE1 extracts "DUS"

from the S1 byte region of the transmitted signal, and sets "DUS" for a connection destination port of the second transmission apparatus NE2 in the selection list 15.

Each of the transmission apparatuses NE1 to NE5 selects a connection destination port so as to switch a synchronization clock of the transmission apparatus by referring to the selection list 15. The first transmission apparatus NE1 recognizes the presence of a selectable connection destination port by referring to the selection list 15. The selection list 15 of the first transmission apparatus NE1 stores the connection destination port (PRS: selected) of the first clock source Ck1 in the first priority order, and the connection destination port (DUS) of the second transmission apparatus NE2 in the second priority order. In addition, the selection list 15 stores the connection destination port (DUS) of the fifth transmission apparatus NE5 in the third priority order. Further, the first transmission apparatus NE1 can identify that the first clock source Ck1 is currently being selected by referring to the selection list 15.

The selection list 15 of the second transmission apparatus NE2 stores the connection destination port (PRS: selected) of the first transmission apparatus NE1 in the first priority order, and the connection destination port (DUS) of the third transmission apparatus NE3 in the second priority order. In addition, the selection list 15 stores the connection destination port (PRS) of the fourth transmission apparatus NE4 in the third priority order, and the connection destination port (PRS) of the fifth transmission apparatus NE5 in the fourth priority order. Further, the second transmission apparatus NE2 can identify that the connection destination port of the first transmission apparatus NE1 is currently being selected by referring to the selection list 15.

The selection list 15 of the third transmission apparatus NE3 stores the connection destination port (PRS: selected) of the second transmission apparatus NE2 in the first priority order, and the connection destination port (DUS) of the fourth transmission apparatus NE4 in the second priority order. The third transmission apparatus NE3 can identify that the connection destination port of the second transmission apparatus NE2 is currently being selected by referring to the selection list 15.

The selection list 15 of the fourth transmission apparatus NE4 stores the connection destination port (PRS) of the second transmission apparatus NE2 in the first priority order, and the connection destination port (PRS: selected) of the third transmission apparatus NE3 in the second priority order. In addition, the selection list 15 stores the connection destination port (PRS) of the fifth transmission apparatus NE5 in the third priority order, and the connection destination port (STU) of the second clock source Ck2 in the fourth priority order. Further, the fourth transmission apparatus NE4 can identify that the connection destination port of the third transmission apparatus NE3 is currently being selected.

The selection list 15 of the fifth transmission apparatus NE5 stores the connection destination port (PRS: selected) of the first transmission apparatus NE1 in the first priority order, the connection destination port (PRS) of the second transmission apparatus NE2 in the second priority order, and the (PRS) of the fourth transmission apparatus NE4 in the third priority order. The fifth transmission apparatus NE5 can identify that the connection destination port of the first transmission apparatus NE1 is currently being selected.

In a case where a connection destination port from which a clock is being selected is switched, the transmission apparatus NE refers to the selection list 15 and determines a connection destination port receiving a synchronization clock in which a clock loop does not occur from the selection list 15.

In addition, the transmission apparatus NE does not switch a port, for example, in a case where a connection destination port having a high priority order becomes valid.

For example, the fourth transmission apparatus NE4 may select one of clocks acquired from the second transmission apparatus NE2, the third transmission apparatus NE3, and the fifth transmission apparatus NE5 and a clock acquired from the second clock source Ck2, by referring to the selection list 15. The fourth transmission apparatus NE4 selects the clock from the third transmission apparatus NE3, and outputs an "FF" (unused) code and a QL code of a connection destination port which is currently being set to each port. In the same manner as the fourth transmission apparatus NE4, the transmission apparatuses NE1 to NE3 and NE5 also output an "FF" code and a QL code of a connection destination port which is currently being set to each port.

Figure 2:
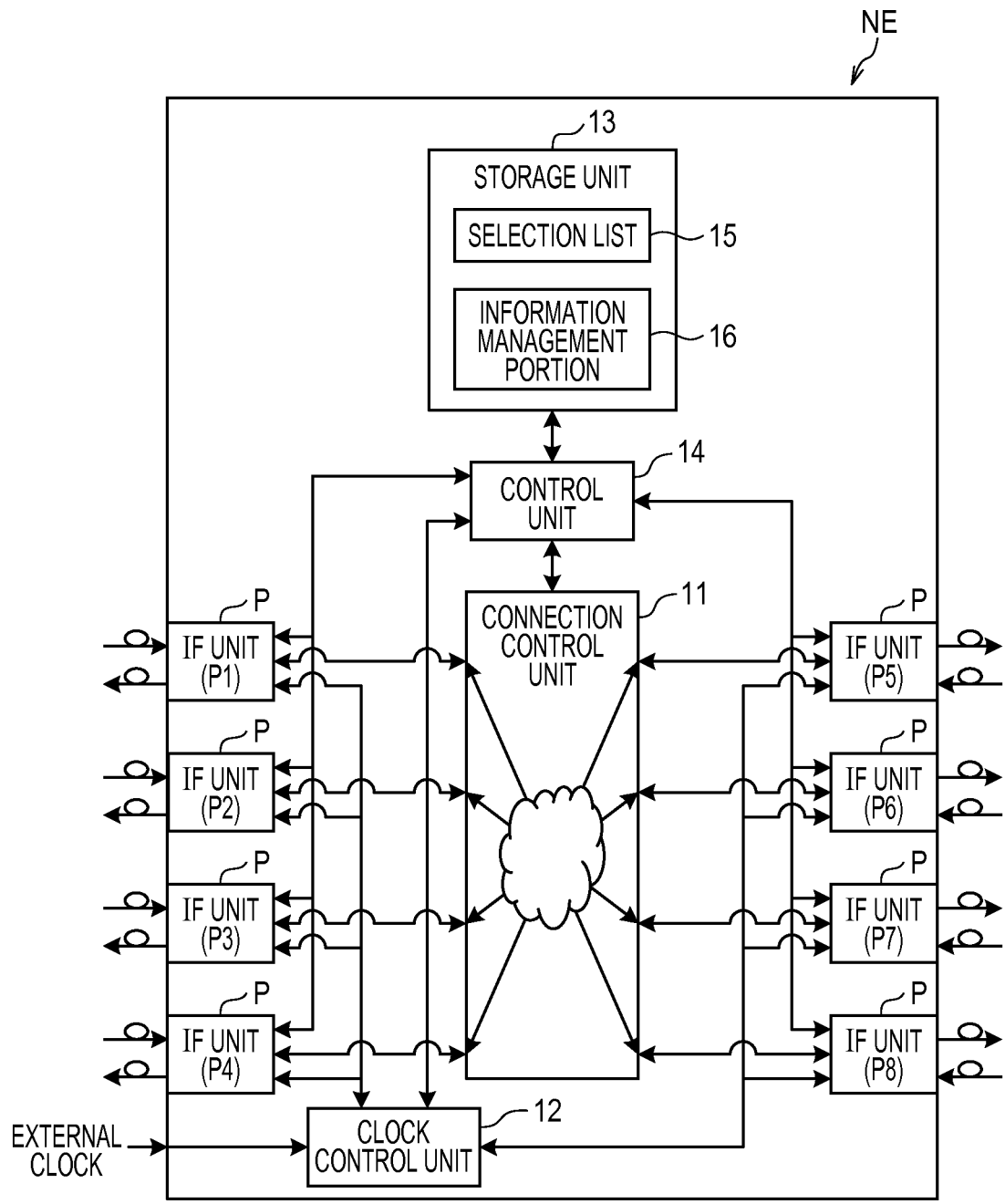
FIG. 2 is a block diagram illustrating an example of a transmission apparatus of the present example.

FIG. 2 is a block diagram illustrating an example of the transmission apparatus NE. The transmission apparatus NE illustrated in FIG. 2 includes IF units P (P1 to P8), a connection control unit 11, a clock control unit 12, a storage unit 13, and a control unit 14. Each of the IF units P is an interface connected to a connection destination port. The connection control unit 11 controls, for example, cross connection for selecting an output destination of a signal which is input from the IF unit P. The clock control unit 12 controls a synchronization clock in which the transmission apparatus NE operates. The storage unit 13 is a region which stores various information pieces. The control unit 14 controls the entire transmission apparatus NE such as various settings or monitoring of warning inside the transmission apparatus NE. The storage unit 13 has the selection list 15 and an information management portion 16. As described above, the selection list 15 stores a connection destination port selectable so as to switch a synchronization clock, and a QL code set for each connection destination port, correspondingly to priority order. The information management portion 16 stores an ID for identifying each transmission apparatus NE in the transmission system 1, lifetime information, a reception record described later, and the like. The lifetime information is used, for example, to trace a connection destination port receiving a synchronization clock. The decrement processing decreased by 1 is executed to the lifetime information every time the information is relayed between the transmission apparatuses NE.

The transmission apparatus NE illustrated in FIG. 2 functions as, for example, a switching station 20, a relay station 30, or the master station 40 depending on operation conditions. For example, in a case where the transmission apparatus NE distributes a synchronization clock from the first clock source Ck1 to other transmission apparatuses NE in the transmission system 1, the control unit 14 of the transmission apparatus NE functions as the master station 40. In addition, in a case where the transmission apparatus NE receives the synchronization clock distributed from the master station 40, the control unit 14 of the transmission apparatus NE functions as the relay station 30. Further, in a case where switching of a synchronization clock occurs due to a failure or the like in the relay station 30, the control unit 14 in the transmission apparatus NE of the relay station 30 function as the switching station 20 which determines a connection destination port receiving the synchronization clock. For example, in the transmission system 1 of FIG. 1, the first transmission apparatus NE1 is used as the master station 40, the second transmission apparatus NE2 is used as the switching station 20, and the third transmission apparatus NE3, the fourth transmission apparatus NE4, and the fifth transmission apparatus NE5 are used as the relay stations 30. Therefore, each of the switching station 20, the relay station 30, or the master station 40 which will be described below is the transmission apparatus NE which functions as the switching station 20, the relay station 30, or the master station 40.

In a case where switching of a synchronization clock of the switching station 20 occurs due to a failure or the like, the switching station 20 outputs inquiry information including an ID for identifying the switching station to the master station 40 which is a source providing the synchronization clock. The inquiry information is information including an inquiry request, addressed to the master station 40, for checking whether or not a clock loop occurs in a connection destination port which is a check target. When the inquiry information is received, the relay station 30 checks a transmission source ID in the inquiry information, and records a connection destination port at which the inquiry information is received in the information management portion 16 as a reception record, correspondingly to the transmission source ID. In addition, the relay station 30 transmits the inquiry information to the master station 40.

When the inquiry information is received, the master station 40 records a connection destination port at which the inquiry information is received in the information management portion 16 as a reception record. The master station 40 generates master response information to which an ID of the master station 40 is added, as response information to the inquiry information. The master station 40 outputs the master response information from the connection destination port at which the inquiry information is received, based on the reception record recorded in the information management portion 16. When the master response information is received, the relay station 30 outputs the master response information from the connection destination port at which the inquiry information is received for the master response information based on the reception record recorded in the information management portion 16.

When the master response information corresponding to the inquiry information of the switching station 20 is received via the relay station 30, the switching station 20 determines that a clock loop does not occur in the connection destination port which has output the inquiry information. In addition, in a case where the inquiry information sent from the switching station 20 is received via the relay station 30, the switching station 20 determines that a clock loop occurs in the connection destination port which has output the inquiry information.

Figure 3:
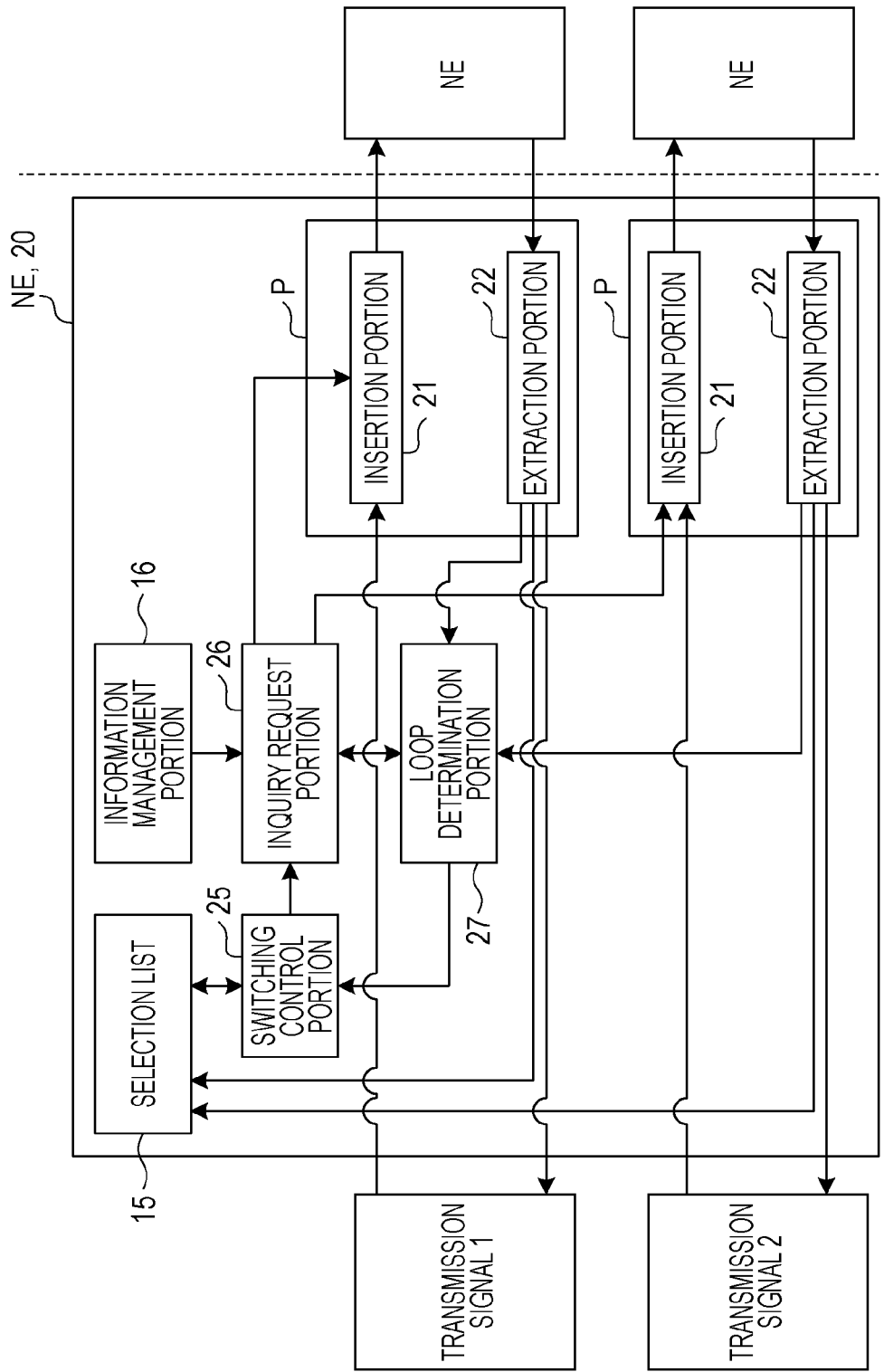
FIG. 3 is a diagram illustrating an example of a switching station.

FIG. 3 is a block diagram illustrating an example of the switching station 20. In a case where clock switching of the switching station 20 is detected, the switching station 20 illustrated in FIG. 3 outputs inquiry information addressed to the master station 40, to a connection destination port receiving a synchronization clock. In addition, in a case where the inquiry information sent from the switching station 20 is received, the switching station 20 determines that a clock loop occurs, the switching station 20 deletes the connection destination port receiving a synchronization clock from the selection list 15, and switches the connection destination port to a connection destination port having the next priority order in the selection list 15. Further, in a case where master response information corresponding to the inquiry information is received, the switching station 20 determines that a clock loop does not occur.

Each of the IF units P of the switching station 20 includes an insertion portion 21 and an extraction portion 22. The insertion portion 21 inserts information such as inquiry information or master response information into an overhead of a transmission signal. The extraction portion 22 extracts the information such as inquiry information or master response information from the overhead of the transmission signal.

The control unit 14 of the switching station 20 includes a switching control portion 25, an inquiry request portion 26, and a loop determination portion 27. The switching control portion 25 selects a connection destination port for switching a synchronization clock based on the priority order by referring to the selection list 15. The switching control portion 25 is, for example, a selection portion. In a case where the connection destination port receiving the synchronization clock is selected, the switching control portion 25 notifies the inquiry request portion 26 of outputting of inquiry information addressed to the master station 40. In addition, the inquiry request portion 26 acquires a transmission source ID for identifying the switching station 20 when the synchronization clock is switched, and an ID of the master station 40 from the information management portion 16, and edits the inquiry information by adding the acquired transmission source ID and the ID of the master station 40 thereto. For example, the inquiry request portion 26 is an output portion.

The insertion portion 21 inserts the edited inquiry information into an overhead of a transmission signal, and outputs the inquiry information for transmission to the master station 40. In addition, the extraction portion 22 extracts inquiry information or master response information from an overhead of a transmission signal which is received from another transmission apparatus NE.

The loop determination portion 27 determines whether or not a clock loop occurs based on the inquiry information or the master response information extracted by the extraction portion 22. For example, the loop determination portion 27 is a determination portion and a control portion. In a case where the information extracted by the extraction portion 22 is master response information corresponding to the inquiry information sent from the switching station 20, the loop determination portion 27 determines that there is no occurrence of a clock loop having the corresponding connection destination port as a path. In addition, in a case where the extracted information is the inquiry information sent from the switching station 20, the loop determination portion 27 determines that there is the occurrence of a clock loop having the corresponding connection destination port as a path. In a case where it is determined that the clock loop does not occur, the loop determination portion 27 notifies the switching control portion 25 that the selected connection destination port is determined as a connection destination port receiving the synchronization clock by referring to the selection list 15. In a case where the loop determination portion 27 determines that the clock loop occurs in the connection destination port, the switching control portion 25 deletes the connection destination port in which the clock loop occurs from the selection list 15. Further, the switching station 20 continuously makes a request for inquiry information until master response information for the inquiry information is received.

Figure 4:
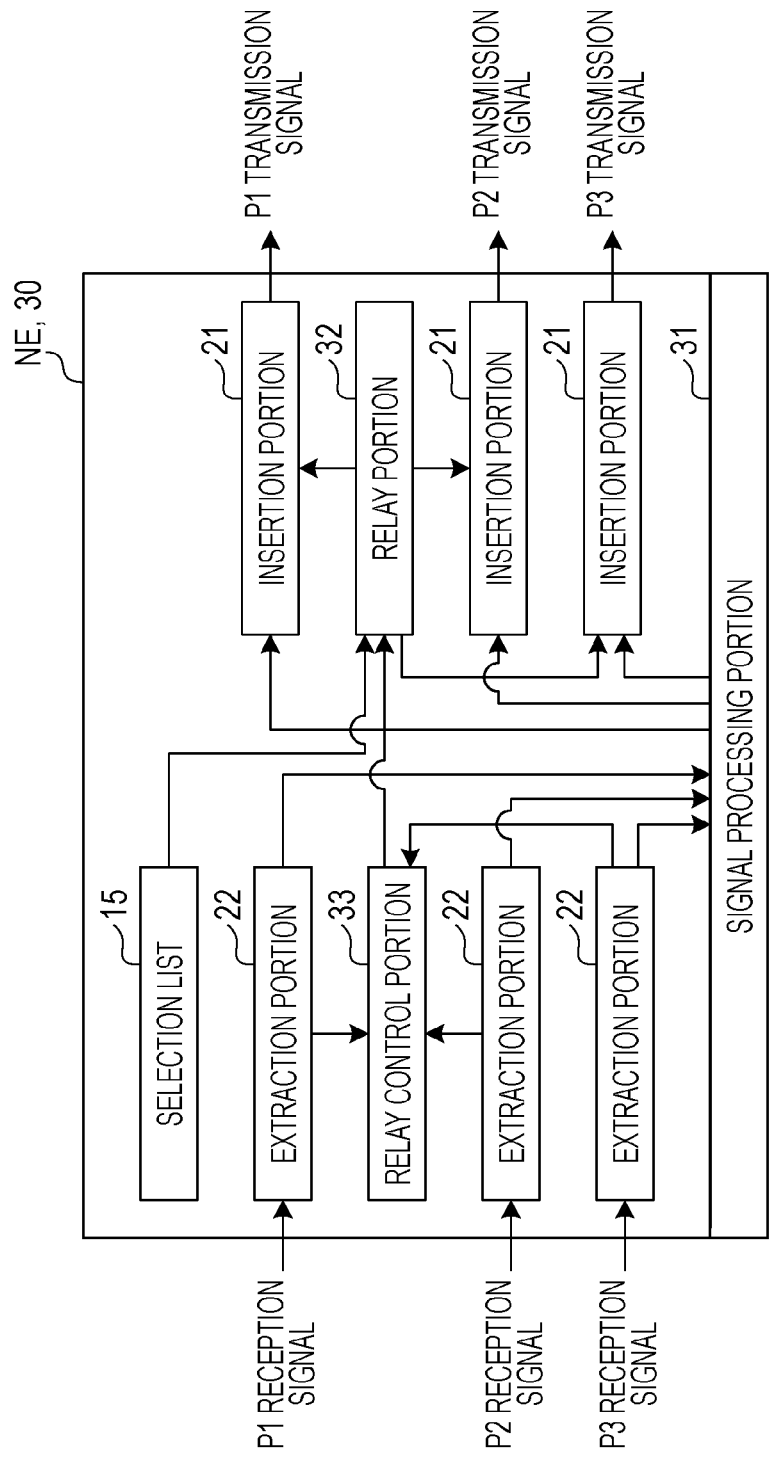
FIG. 4 is a diagram illustrating an example of a relay station.

FIG. 4 is a block diagram illustrating an example of the relay station 30. When inquiry information is received from the switching station 20, the relay station 30 illustrated in FIG. 4 records the connection destination port at which the inquiry information is received in the information management portion 16 as a reception record, and transmits the inquiry information to a connection destination port which is currently being selected. When master response information is received from the master station 40, the relay station 30 transmits the master response information to the connection destination port at which the inquiry information is received based on the reception record which is recorded in the information management portion 16.

The control unit 14 of the relay station 30 includes a signal processing portion 31, a relay portion 32, and a relay control portion 33. The signal processing portion 31 performs, for example, a signal process on a transmission signal. The relay portion 32 refers to the selection list 15 and transmits inquiry information or master response information to the transmission apparatus NE as a connection destination port. For example, the relay portion 32 is a transmission portion. The relay control portion 33 controls the entire relay station 30. In a case where inquiry information is received, the relay control portion 33 records a connection destination port at which the inquiry information is received in the information management portion 16 as a reception record. The relay portion 32 edits lifetime information in the received inquiry information by the decrement processing decreased by 1 to the lifetime information.

In a case where master response information is received, the relay control portion 33 controls the relay portion 32 in order to transmit the master response information to a connection destination port at which inquiry information corresponding to the master response information is received based on a reception record recorded in the information management portion 16. The relay portion 32 selects an IF unit P related to the connection destination port at which the inquiry information corresponding to the master response information is received in order to transmit the master response information. The insertion portion 21 of the IF unit P inserts the master response information into an overhead of a transmission signal and transmits the signal.

Figure 5:
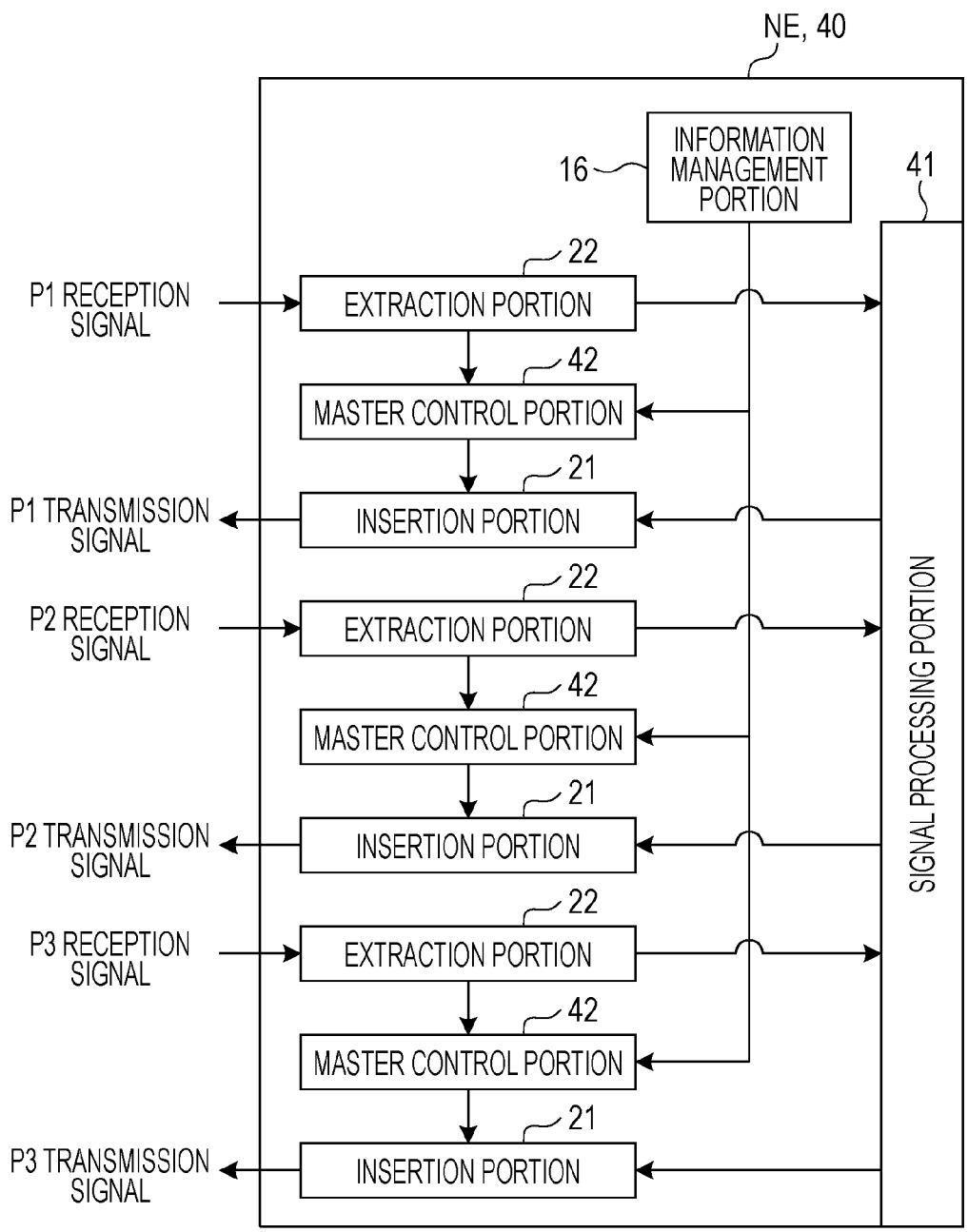
FIG. 5 is a diagram illustrating an example of a master station.

FIG. 5 is a diagram illustrating an example of the master station 40. The master station 40 illustrated in FIG. 5 is the transmission apparatus NE which provides a synchronization clock to the other transmission apparatuses NE in the transmission system 1. In a case where inquiry information addressed to the master station 40 is received, the master station 40 records the connection destination port at which the inquiry information is received as a reception record. In addition, the master station 40 sends master response information for the inquiry information addressed to the master station 40, to the switching station 20.

The control unit 14 of the master station 40 includes a signal processing portion 41 and a master control portion 42. The signal processing portion 41 performs a signal position on a transmission signal. In a case where inquiry information is extracted by the extraction portion 22, the master control portion 42 records a connection destination port at which the inquiry information is received in the information management portion 16 as a reception record. Further, the master control portion 42 generates master response information including lifetime information read from the information management portion 16. The master control portion 42 transmits the master response information to the insertion portion 21 related to the connection destination port at which the inquiry information is received in order to output the master response information based on the reception record which is recorded in the information management portion 16.

Figures 6, 7:
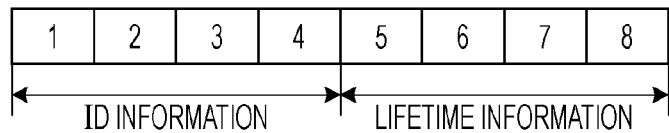
FIG. 6 is a diagram illustrating an example of an overhead configuration of a transmission signal.
FIG. 7 is a diagram illustrating an example of an information table indicating a list of content of an overhead.

FIG. 6 is a diagram illustrating an example of information configuration of an overhead of a transmission signal. FIG. 7 is a table illustrating an example of information content such as inquiry information or master response information. Information of an overhead of a transmission signal which is transmitted between the transmission apparatuses NE is formed by 8 bits as illustrated in FIG. 6, and the first half of 4 bits are used for ID information, and the second half of 4 bits are used for lifetime information. The first half of 4 bits are used for information such as ID information of the transmission apparatus NE in inquiry information or master response information, and are defined by codes. The second half of 4 bits are used for lifetime information for managing the number of passing transmission apparatuses NE, and are defined by codes. For example, in a case where inquiry information is received, the transmission apparatus NE discards the inquiry information when lifetime information of the inquiry information becomes "0". A plurality of overheads of a transmission signal may be used so as to form multiple frames, and thus an amount of information such as inquiry information or master response information may be increased. As a result, a manageable network scale can be expanded. In addition, the table illustrated in FIG. 7 is assumed to be stored in the information management portion 16.

Figure 8:
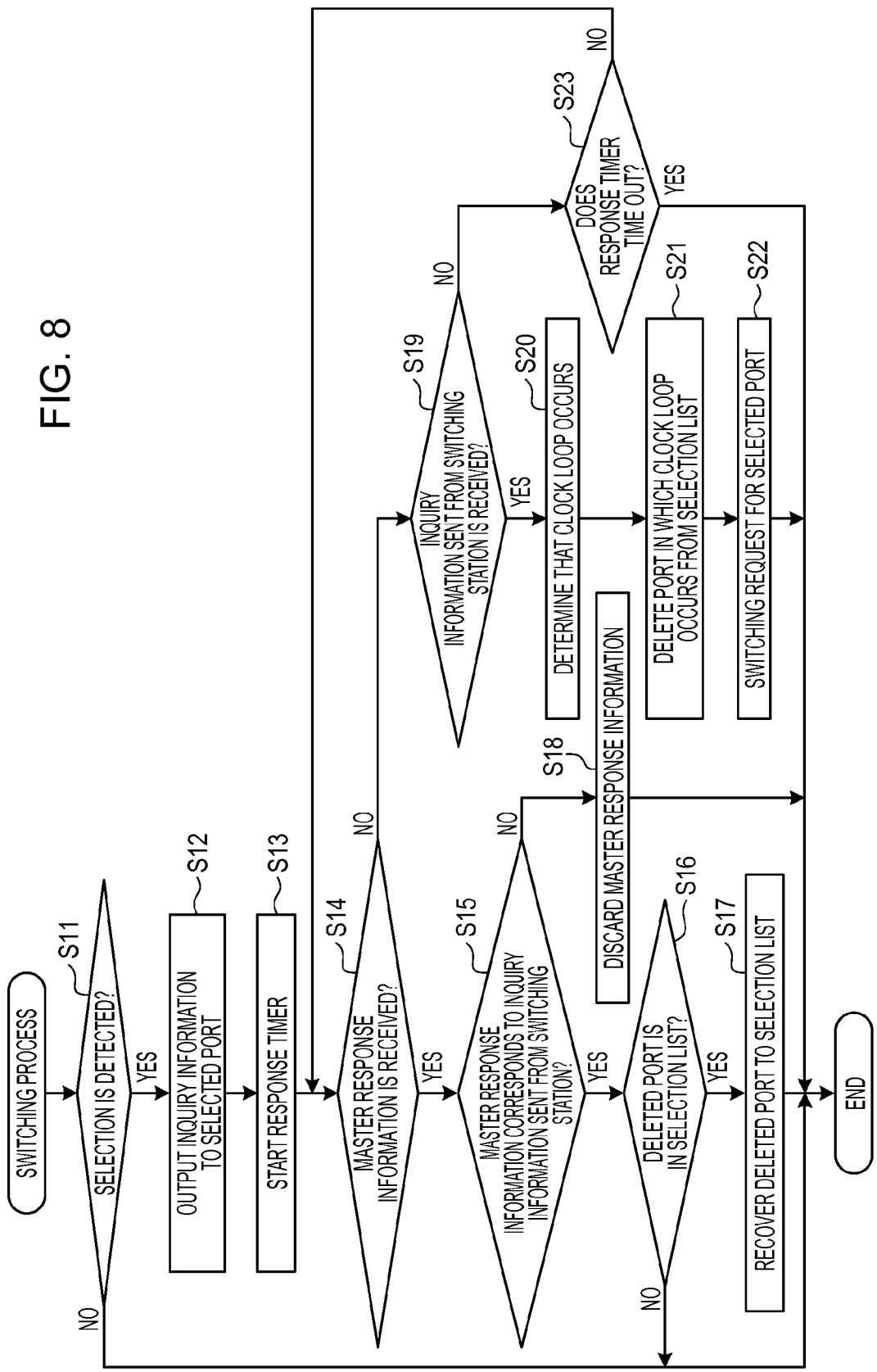
FIG. 8 is a flowchart illustrating an example of a process operation of the switching station related to a switching process.

Next, a description will be made of an operation of the switching station 20 in the transmission system 1 of the present example. FIG. 8 is a flowchart illustrating an example of an operation of the switching station 20 related to a switching process. The switching process illustrated in FIG. 8 is a process which is performed by the switching station 20 in a case where switching to a connection destination port for switching a synchronization clock is detected. The switching control portion 25 of the switching station 20 illustrated in FIG. 8 determines whether or not selection of a connection destination port for switching a synchronization clock is detected (operation S11). If the selection of the connection destination port are detected (affirmative in operation S11), the switching control portion 25 outputs inquiry information, addressed to the master station 40 and including ID information for identifying the switching station 20, to the connection destination port which is currently being selected as a clock source (operation S12).

The switching control portion 25 starts a response timer which counts monitoring time for monitoring reception of master response information corresponding to the inquiry information (operation S13), and determines whether or not the master response information is received from the master station 40 (operation S14). If the master response information is received (affirmative in operation S14), the switching control portion 25 determines whether or not the master response information is master response information corresponding to the inquiry information sent from the switching station 20 (operation S15).

If the master response information is master response information corresponding to the inquiry information sent from the switching station (affirmative in operation S15), the switching control portion 25 determines that a clock loop does not occur in the connection destination port which is currently being selected. In addition, the switching control portion 25 determines that a clock loop does not occur and then determines whether or not there is a connection destination port which has been deleted from the selection list 15 (operation S16). If there is a connection destination port which has been deleted from the selection list 15 (affirmative in operation S16), the switching control portion 25 recovers the deleted connection destination port to the selection list 15 (operation S17), and finishes the process operation illustrated in FIG. 8. The reason why the deleted connection destination port is recovered to the selection list 15 is that a clock loop may be removed due to an influence of path switching of each transmission apparatus NE in the future.

If the master response information is not master response information corresponding to the inquiry information sent from the switching station (negative in operation S15), the switching control portion 25 discards the received master response information (operation S18) and finishes the process operation illustrated in FIG. 8.

If master response information is not received (negative in operation S14), the loop determination portion 27 determines whether or not the inquiry information sent from the switching station is received (operation S19). If the inquiry information sent from the switching station is received (affirmative in operation S19), the loop determination portion 27 determines that a clock loop occurs (operation S20).

The switching control portion 25 deletes the connection destination port in which the clock loop occurs from the selection list 15 (operation S21), makes a request for switching to and selection of a connection destination port having the next priority order in the selection list 15 (operation S22), and finishes the operation process illustrated in FIG. 8. If the switching and selection are not detects (negative in operation S11), the switching control portion 25 finishes the process operation illustrated in FIG. 8.

If the inquiry information sent from the switching station is not received (negative in operation S19), the switching control portion 25 determines whether or not the response timer times out (operation S23). If the response timer times out (affirmative in operation S23), the switching control portion 25 finishes the process operation illustrated in FIG. 8. If the response timer does not time out (negative in operation S23), the switching control portion 25 proceeds to operation S14 so as to determine whether or not master response information is received. In addition, if there is no connection destination port which has been deleted from the selection list 15 (negative in operation S16), the switching control portion 25 finishes the process operation illustrated in FIG. 8.

In a case where switching to and selection of a connection destination port are detected, the switching station 20 which performs the switching process illustrated in FIG. 8 outputs inquiry information addressed to the master station 40, and determines that a clock loop occurs when the connection destination port is used, if the inquiry information sent from the switching station 20 is received from another transmission apparatus NE. As a result, in a case where the switching to and selection of the connection destination port are detected, the switching station 20 can recognize the clock loop occurrence in the switched connection destination port.

Further, in a case where it is determined that a clock loop occurs in the connection destination port, the switching station 20 deletes the connection destination port in which the clock loop occurs from the selection list 15. As a result, the switching station 20 can search for a connection destination port in which a clock loop does not occur by referring to the selection list 15.

In a case where master response information corresponding to inquiry information sent from the switching station 20 is received, the switching station 20 determines that a clock loop does not occur in a connection destination port. As a result, in a case where switching to and selection of the connection destination port are detected, the switching station 20 can recognize that a clock loop does not occur in the switched connection destination port.

Figure 9:
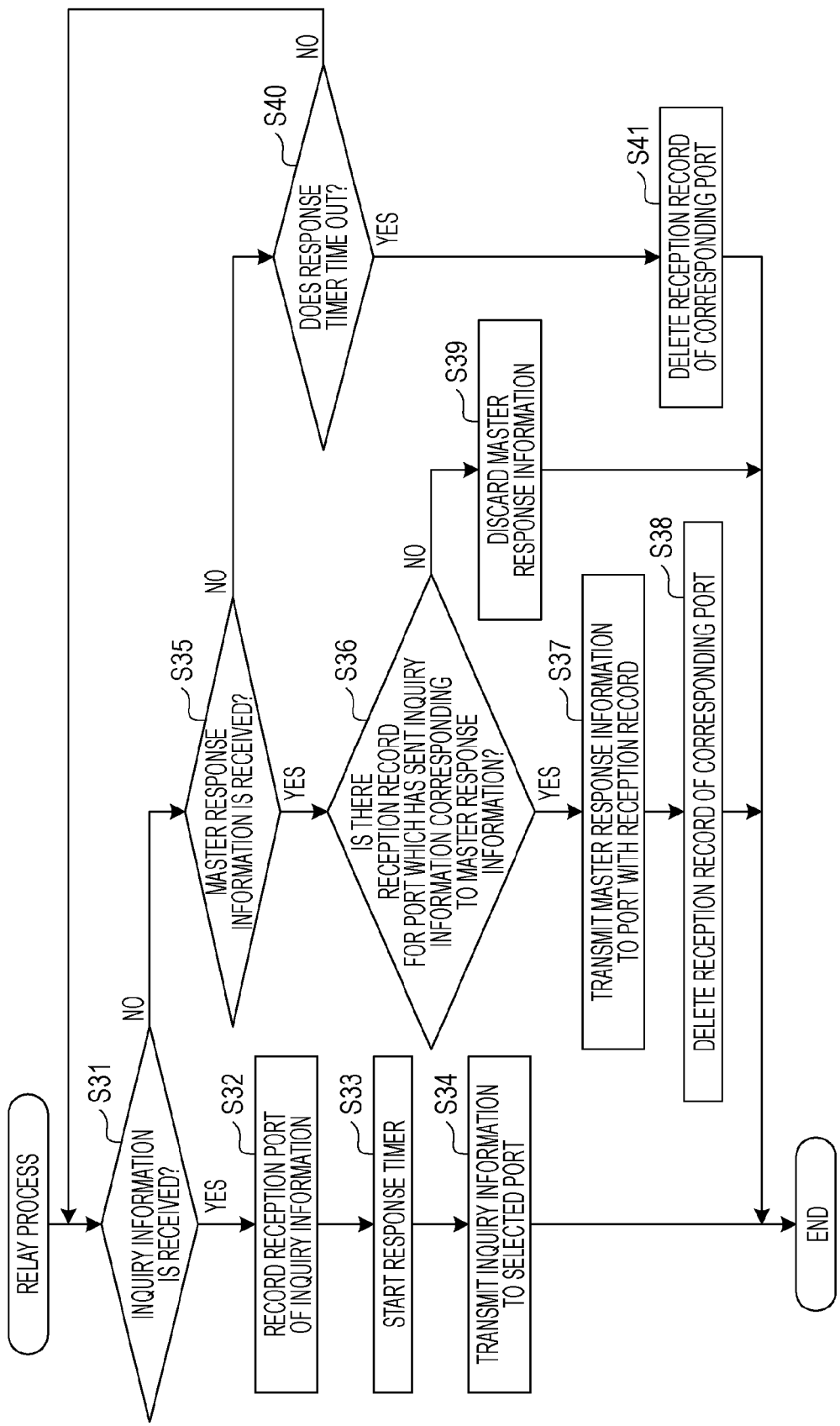
FIG. 9 is a flowchart illustrating an example of a process operation of a relay station related to a relay process.

Next, a description will be made of an operation of the relay station 30. FIG. 9 is a flowchart illustrating an example of a process operation of the relay station 30 related to a relay process. The relay process illustrated in FIG. 9 is a process which is performed by the relay station 30 in a case where inquiry information or master response information is received from the master station 40 and the switching station 20. The relay control portion 33 of the relay station 30 illustrated in FIG. 9 determines whether or not inquiry information is received (operation S31). If the inquiry information is received (affirmative in operation S31), the relay control portion 33 records a connection destination port at which the inquiry information received in the information management portion 16 as a reception record (operation S32). The relay control portion 33 starts a response timer which counts monitoring time for monitoring reception of master response information corresponding to the inquiry information (operation S33). After starting the response timer, the relay control portion 33 transmits the inquiry information to a port which is currently being selected via the relay portion 32 (operation S34) and finishes the process operation illustrated in FIG. 9. In addition, the relay control portion 33 executes the decrement processing decreased by 1 to lifetime information when transmitting the inquiry information.

If inquiry information is not received (negative in operation S31), the relay control portion 33 determines whether or not master response information is received (operation S35). If the master response information is received (affirmative in operation S35), the relay control portion 33 determines whether or not there is a reception record of a connection destination port at which inquiry information corresponding to the master response information is received (operation S36).

If there is the reception record in the information management portion 16 (affirmative in operation S36), the relay control portion 33 instructs the relay portion 32 to transmit the master response information to the connection destination port for the reception record (operation S37). The relay control portion 33 deletes the reception record for the connection destination port from the information management portion 16 (operation S38), and finishes the process operation illustrated in FIG. 9.

If there is no reception record of the connection destination port (negative in operation S36), the relay control portion 33 discards the received master response information (operation S39), and finishes the process operation illustrated in FIG. 9. In other words, the relay control portion 33 determines that the master response information is not master response information corresponding to inquiry information sent from the relay station, and discards the master response information.

If master response information is not received (negative in operation S35), the relay control portion 33 determines whether or not the response timer started in operation S33 times out (operation S40). If the response timer times out (affirmative in operation S40), the relay control portion 33 determines that there is no master response information for the inquiry information transmitted in operation S34. In addition, the relay control portion 33 deletes the reception record of the connection destination port at which the inquiry information is received from the information management portion 16 (operation S41) and finishes the process operation illustrated in FIG. 9. If the response timer does not time out (negative in operation S40), the relay control portion 33 proceeds to operation S31 so as to determine whether or not inquiry information is received.

In a case where inquiry information is received, the relay station 30 which performs the relay process illustrated in FIG. 9 records a connection destination port at which the inquiry information is received as a reception record, and transmits the inquiry information to a connection destination port which is currently being selected. As a result, the relay station 30 can transmit inquiry information from the switching station 20.

In a case where master response information corresponding to inquiry information is received, the relay station 30 determines whether or not a reception record of the inquiry information is present, and transmits the master response information to a connection destination port at which the inquiry information is received if there is the reception record.

As a result, the relay station 30 can transmit master response information corresponding to inquiry information, from the master station 40.

Figure 10:
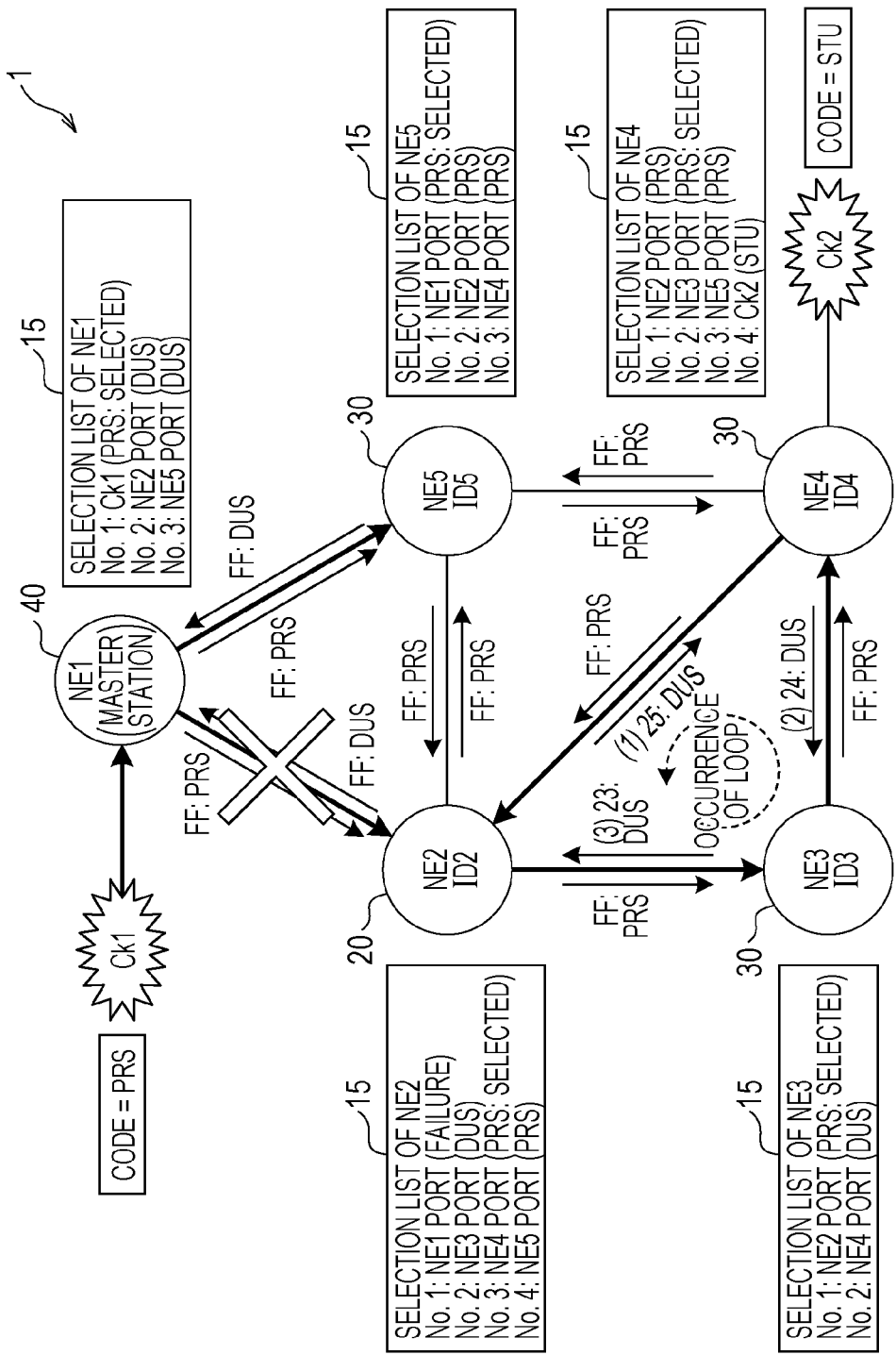
FIG. 10 is a diagram illustrating an example of a process operation of each transmission apparatus in relation to a normal state, failure occurrence, and clock recovery in the transmission system.
Figure 11:
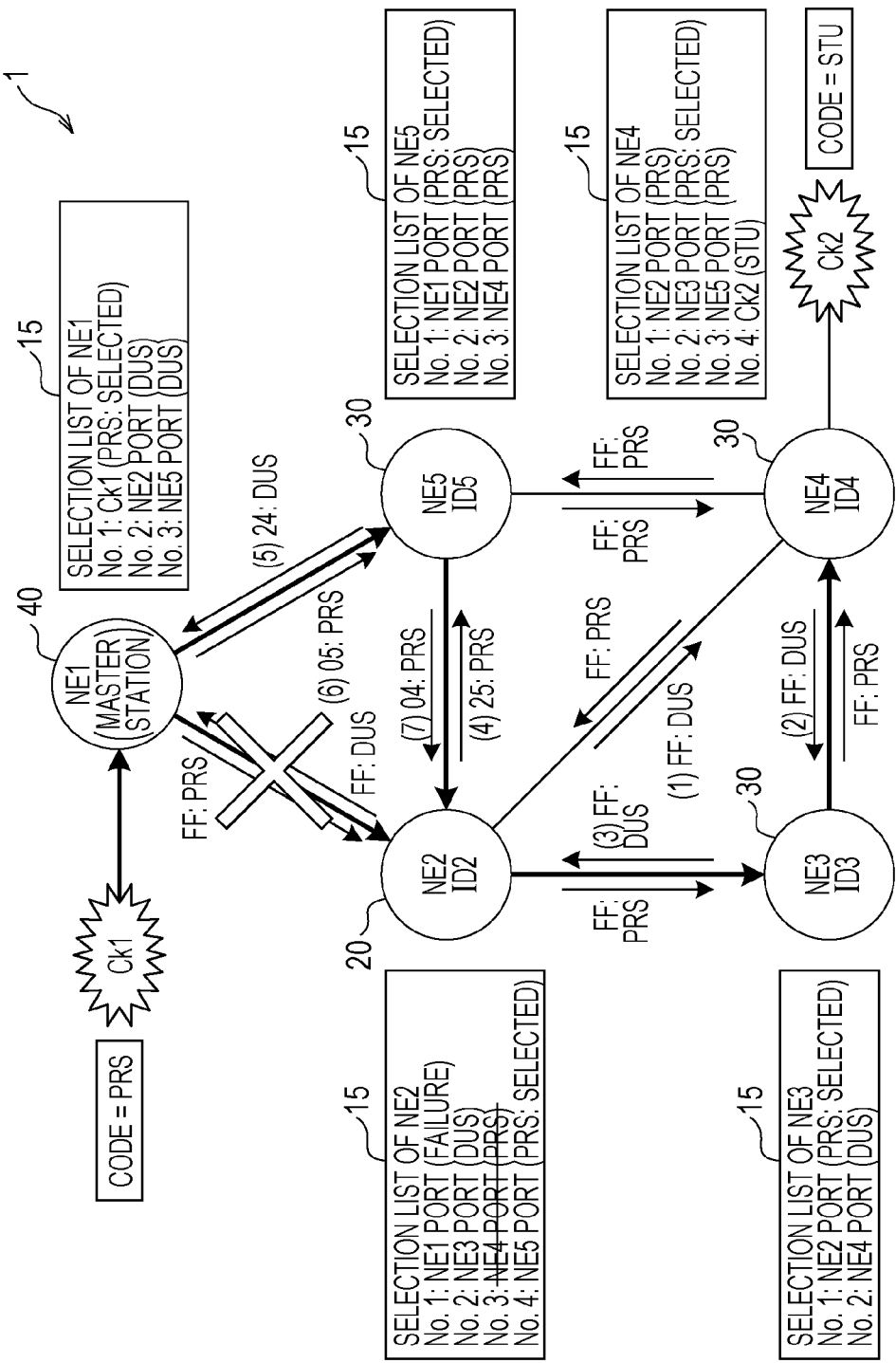
FIG. 11 is a diagram illustrating an example of a process operation of each transmission apparatus in relation to a normal state, failure occurrence, and clock recovery in the transmission system.
Figure 12:
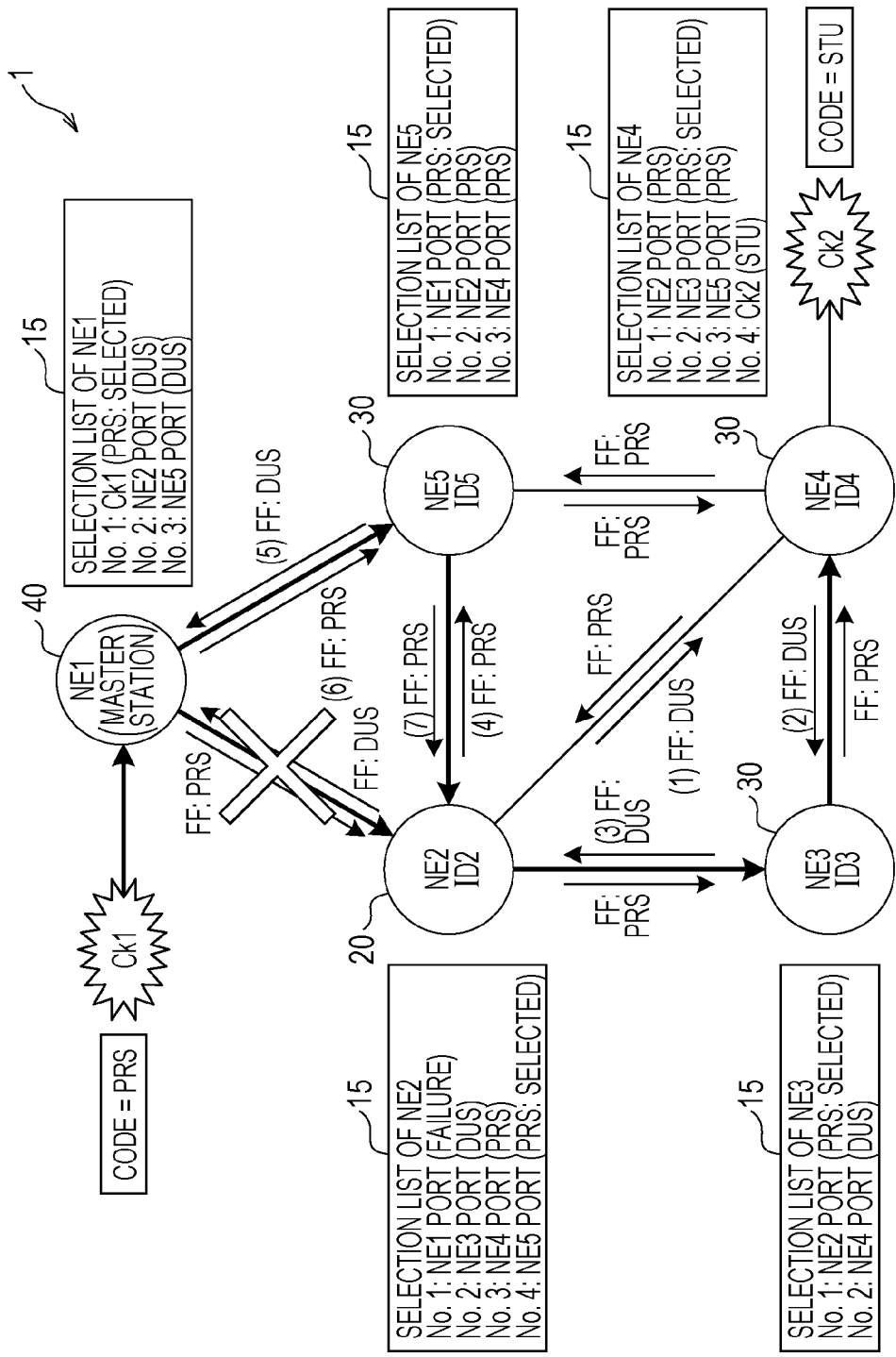
FIG. 12 is a diagram illustrating an example of a process operation of each transmission apparatus in relation to a normal state, failure occurrence, and clock recovery in the transmission system.

Next, a description will be made of an operation of each transmission apparatus NE in the transmission system 1. In the example illustrated in FIG. 1, for convenience of description, it is assumed that the first transmission apparatus NE1 is included in the master station 40, and the transmission system 1 is in a normal state. FIGS. 10 to 12 are diagrams illustrating an example of a process operation of each transmission apparatus NE in relation to a normal state, the failure occurrence, and clock recovery in the transmission system 1. An example of FIG. 10 illustrates that a failure occurs between the first transmission apparatus NE1 and the second transmission apparatus NE2, and it is assumed that the first transmission apparatus NE1 is included in the master station 40, the third transmission apparatus NE3 and the fourth transmission apparatus NE4 are the relay station 30, and the second transmission apparatus NE2 is the switching station 20.

The second transmission apparatus NE2 illustrated in FIG. 10 functions as the switching station 20 since switching of a connection destination port occurs due to a failure between the first transmission apparatus NE1 and the second transmission apparatus NE2. The second transmission apparatus NE2 refers to the selection list 15 and selects the fourth transmission apparatus NE4 having "PRS" and the third priority order as a connection destination port.

The second transmission apparatus NE2 outputs inquiry information 2:5 including ID information "2" for identifying the second transmission apparatus NE2 and lifetime information "5" to the connection destination port of the fourth transmission apparatus NE4. In addition, the inquiry information 2:5 indicates "2" as the ID information and "5" as the lifetime information. When the inquiry information 2:5 is received from the second transmission apparatus NE2, the fourth transmission apparatus NE4 is not the master station 40 and thus functions as the relay station 30. The fourth transmission apparatus NE4 records the connection destination port of the second transmission apparatus NE2 which has sent the inquiry information 2:5 in the information management portion 16 as a reception record. In addition, the fourth transmission apparatus NE4 transmits the inquiry information 2:4 which includes the ID information "2" for identifying the second transmission apparatus NE2 and in which the lifetime information is reduced by −1 so as to be updated to "4", to the connection destination port of the third transmission apparatus NE3 which is currently being selected.

When the inquiry information 2:4 is received from the fourth transmission apparatus NE4, the third transmission apparatus NE3 is not the master station 40, thus functions as the relay station 30, and records the connection destination port of the fourth transmission apparatus NE4 which has sent the inquiry information in the information management portion 16 as a reception record. In addition, the third transmission apparatus NE3 transmits the inquiry information 2:3 in which the lifetime information is reduced by −1 so as to be updated to "3", to the connection destination port of the second transmission apparatus NE2 which is currently being selected. When the inquiry information 2:3 is received from the third transmission apparatus NE3, since the inquiry information is output from the second transmission apparatus NE2, the second transmission apparatus NE2 determines that there is the occurrence of a clock loop having the connection destination port of the fourth transmission apparatus NE4 as a path. In other words, the second transmission apparatus NE2 can recognize that a clock loop occurs among the second transmission apparatus NE2, the third transmission apparatus NE3, and the fourth transmission apparatus NE4.

The second transmission apparatus NE2 illustrated in FIG. 11 deletes the connection destination port of the fourth transmission apparatus NE4 from the selection list 15 since it is determined that there is the occurrence of the clock loop having the connection destination port of the fourth transmission apparatus NE4 as a path. In addition, the second transmission apparatus NE2 refers to the selection list 15 and selects the connection destination port of the fifth transmission apparatus NE5 having the fourth priority order which is the next priority order. In the third transmission apparatus NE3 and the fourth transmission apparatus NE4, the reception records which have been previously recorded due to the reception of the inquiry information are deleted from the information management portion 16 due to time-out of the response timers of the respective transmission apparatuses NE.

The second transmission apparatus NE2 selects the connection destination port of the fifth transmission apparatus NE5, outputs inquiry information 2:5 including ID information "2" for identifying the second transmission apparatus NE2 and lifetime information "5" to the connection destination port of the fifth transmission apparatus NE5. When the inquiry information 2:5 is received from the second transmission apparatus NE2, the fifth transmission apparatus NE5 is not the master station 40, thus functions as the relay station 30 and records the connection destination port of the second transmission apparatus NE2 which has sent the inquiry information 2:5 in the information management portion 16 as a reception record. In addition, the fifth transmission apparatus NE5 transmits the inquiry information 2:4 in which the lifetime information is reduced by −1 so as to be updated to "4", to the connection destination port of the first transmission apparatus NE1 which is currently being selected.

When the inquiry information 2:4 is received from the fifth transmission apparatus NE5, the first transmission apparatus NE1 is included in the master station 40, thus functions as the master station 40, and records the connection destination port of the fifth transmission apparatus NE5 which has sent the inquiry information in the information management portion 16 as a reception record. In addition, the first transmission apparatus NE1 outputs master response information 0:5 including ID information "0" for identifying the master station 40 and lifetime information "5" to the connection destination port of the fifth transmission apparatus NE5 based on the reception record. Further, after outputting the master response information 0:5, the first transmission apparatus NE1 deletes the reception record including the connection destination port of the fifth transmission apparatus NE5 having sent the inquiry information from the information management portion 16.

When the master response information 0:5 is received from the first transmission apparatus NE1, the fifth transmission apparatus NE5 is not the master station 40 and functions as the relay station 30. The fifth transmission apparatus NE5 transmits master response information 0:4 in which the lifetime information is reduced by −1 so as to be updated to "4", to the connection destination port of the second transmission apparatus NE2 which has sent the inquiry information 2:4 corresponding to the master response information 0:5 based on the reception record. The fifth transmission apparatus NE5 transmits the master response information 0:4 to the connection destination port of the second transmission apparatus NE2 and then deletes the reception record including the connection destination port of the second transmission apparatus NE2 having sent the inquiry information from the information management portion 16.

In a case where the master response information 0:4 corresponding to the inquiry information 2:5 output from the second transmission apparatus NE2 is received, the second transmission apparatus NE2 determines that a clock loop does not occur in the connection destination port of the fifth transmission apparatus NE5 which is currently being selected. In addition, the second transmission apparatus NE2 determines the connection destination port of the currently selected fifth transmission apparatus NE5 in which a clock loop does not occur, as a reception path of a synchronization clock. When the reception path of a synchronization clock is determined, the second transmission apparatus NE2 illustrated in FIG. 12 recovers the deleted connection destination port of the fourth transmission apparatus NE4 to the selection list 15. The second transmission apparatus NE2 can remove a synchronization clock loop occurring in the mesh type transmission system 1, and can acquire a clock from the first transmission apparatus NE1 via the fifth transmission apparatus NE5.

Figure 13:
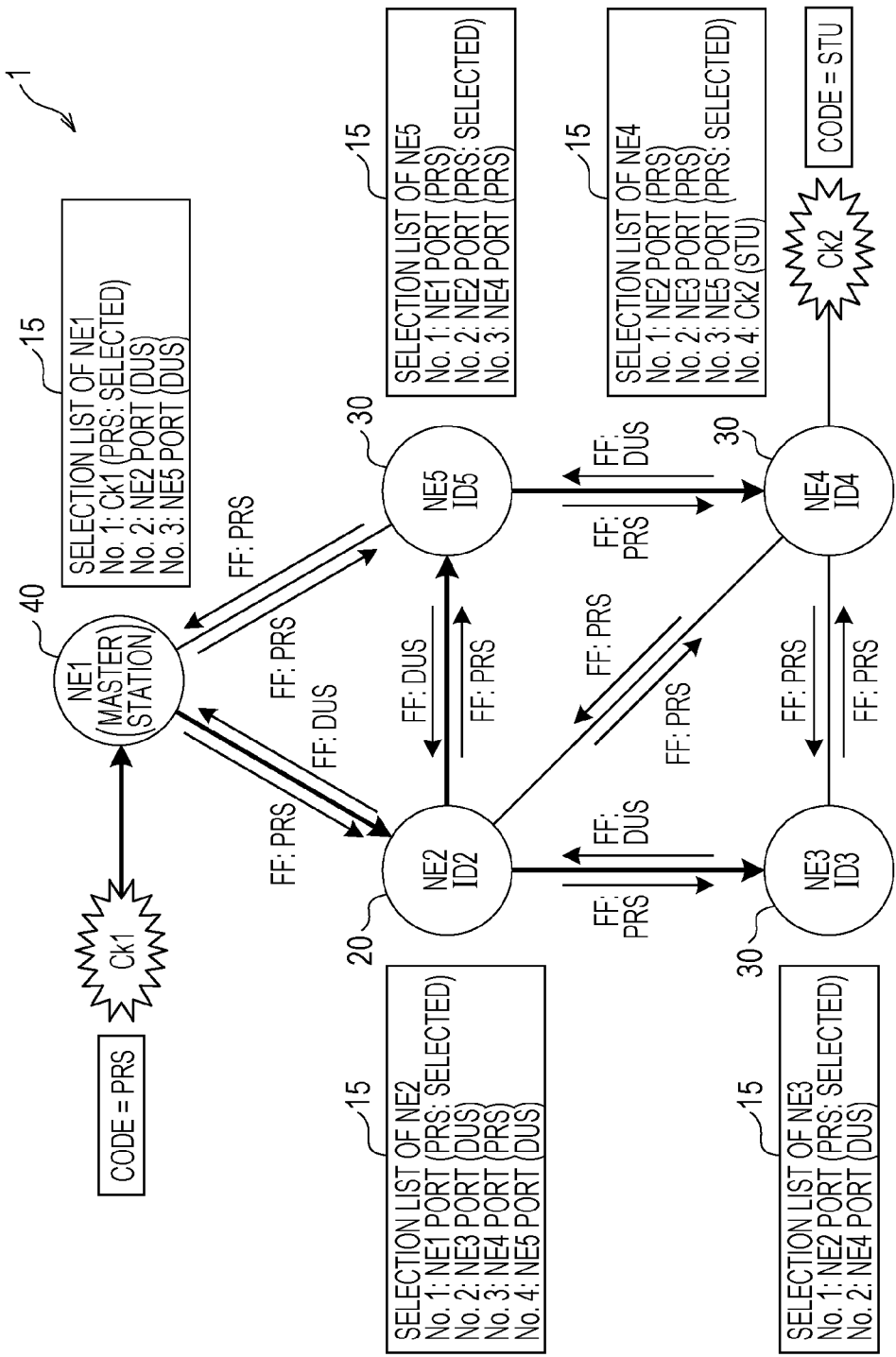
FIG. 13 is a diagram illustrating an example of a process operation of each transmission apparatus in relation to a normal state, failure occurrence, clock free-running, and clock recovery in the transmission system.

In the example illustrated in FIGS. 10 to 12, a case has been exemplified in which a connection destination port in which a clock loop does not occur can be searched for in the selection list 15 of the switching station 20, and a description will be made of a case where a connection destination port in which a clock loop does not occur may not be searched for in the selection list 15 of the switching station 20. FIGS. 13 to 18 are diagrams illustrating an example of a process operation of each transmission apparatus NE in relation to a normal state, the failure occurrence, clock free-running, and clock recovery in the transmission system 1. The first transmission apparatus NE1 illustrated in FIG. 13 is the master station 40 which is synchronized with a clock from the first clock source Ck1. The second transmission apparatus NE2 is subordinately synchronized with a clock from the first transmission apparatus NE1. The third transmission apparatus NE3 is subordinately synchronized with a clock from the second transmission apparatus NE2. The fifth transmission apparatus NE5 is subordinately synchronized with a clock from the second transmission apparatus NE2. The fourth transmission apparatus NE4 is subordinately synchronized with a clock from the fifth transmission apparatus NE5.

The selection list 15 of the first transmission apparatus NE1 illustrated in FIG. 13 stores the connection destination port (PRS: selected) of the first clock source Ck1 in the first priority order and the connection destination port (DUS) of the second transmission apparatus NE2 in the second priority order. In addition, the selection list 15 stores the connection destination port (DUS) of the fifth transmission apparatus NE5 in the third priority order. Further, the first transmission apparatus NE1 identifies that the first clock source Ck1 is currently being selected by referring to the selection list 15.

The selection list 15 of the second transmission apparatus NE2 stores the connection destination port (PRS: selected) of the first transmission apparatus NE1 in the first priority order, and the connection destination port (DUS) of the third transmission apparatus NE3 in the second priority order. In addition, the selection list 15 stores the connection destination port (PRS) of the fourth transmission apparatus NE4 in the third priority order, and the connection destination port (DUS) of the fifth transmission apparatus NE5 in the fourth priority order. Further, the second transmission apparatus NE2 identifies that the connection destination port of the first transmission apparatus NE1 is currently being selected by referring to the selection list 15.

The selection list 15 of the third transmission apparatus NE3 stores the connection destination port (PRS: selected) of the second transmission apparatus NE2 in the first priority order, and the connection destination port (DUS) of the fourth transmission apparatus NE4 in the second priority order. The third transmission apparatus NE3 can identify that the connection destination port of the second transmission apparatus NE2 is currently being selected by referring to the selection list 15.

The selection list 15 of the fourth transmission apparatus NE4 stores the connection destination port (PRS) of the second transmission apparatus NE2 in the first priority order, and the connection destination port (PRS) of the third transmission apparatus NE3 in the second priority order. In addition, the selection list 15 stores the connection destination port (PRS: selected) of the fifth transmission apparatus NE5 in the third priority order, and the connection destination port (STU) of the second clock source Ck2 in the fourth priority order. Further, the fourth transmission apparatus NE4 identifies that the connection destination port of the fifth transmission apparatus NE5 is currently being selected.

The selection list 15 of the fifth transmission apparatus NE5 stores the connection destination port (PRS) of the first transmission apparatus NE1 in the first priority order, and the connection destination port (PRS: selected) of the second transmission apparatus NE2 in the second priority order. In addition, the selection list 15 stores the (DUS) of the fourth transmission apparatus NE4 in the third priority order. The fifth transmission apparatus NE5 identifies that the connection destination port of the second transmission apparatus NE2 is currently being selected.

Figure 14:
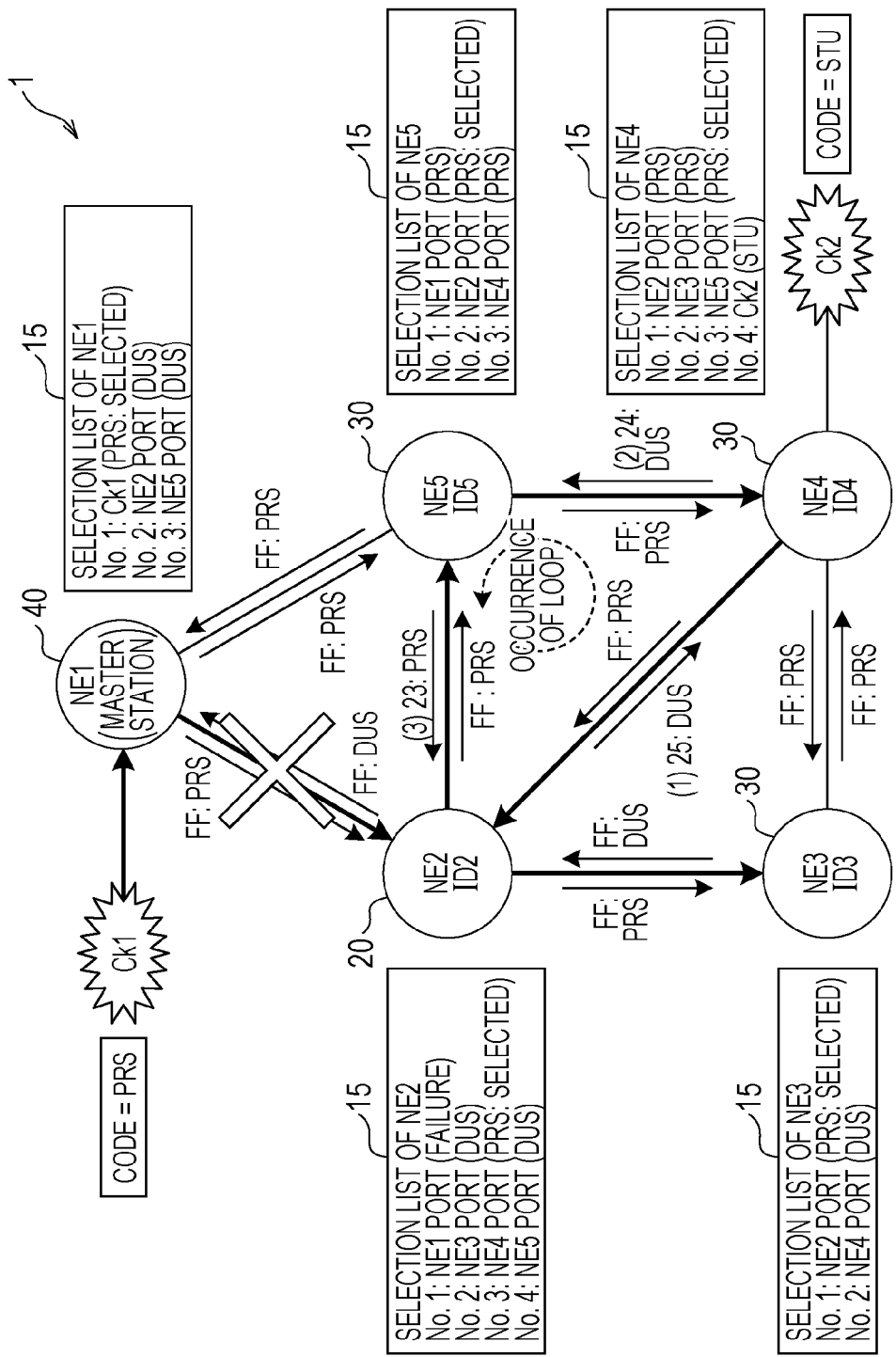
FIG. 14 is a diagram illustrating an example of a process operation of each transmission apparatus in relation to a normal state, failure occurrence, clock free-running, and clock recovery in the transmission system.

The second transmission apparatus NE2 illustrated in FIG. 14 functions as the switching station 20 since switching of a connection destination port of the first transmission apparatus NE1 occurs due to a failure between the first transmission apparatus NE1 and the second transmission apparatus NE2. The second transmission apparatus NE2 refers to the selection list 15 and selects the fourth transmission apparatus NE4 having "PRS" and the third priority order as a connection destination port.

The second transmission apparatus NE2 outputs inquiry information 2:5 including ID information "2" for identifying the second transmission apparatus NE2 and lifetime information "5" to the connection destination port of the fourth transmission apparatus NE4. When the inquiry information 2:5 is received from the second transmission apparatus NE2, the fourth transmission apparatus NE4 is not the master station 40 and thus functions as the relay station 30. The fourth transmission apparatus NE4 records the connection destination port of the second transmission apparatus NE2 which has sent the inquiry information 2:5 in the information management portion 16 as a reception record. In addition, the fourth transmission apparatus NE4 transmits inquiry information 2:4 in which the lifetime information is reduced by −1 so as to be updated to "4", to the connection destination port of the fifth transmission apparatus NE5 which is currently being selected.

When the inquiry information 2:4 is received from the fourth transmission apparatus NE4, the fifth transmission apparatus NE5 is not the master station 40, thus functions as the relay station 30, and records the connection destination port of the fourth transmission apparatus NE4 which has sent the inquiry information in the information management portion 16 as a reception record. In addition, the fifth transmission apparatus NE5 transmits inquiry information 2:3 in which the lifetime information is reduced by −1 so as to be updated to "3", to the connection destination port of the second transmission apparatus NE2 which is currently being selected. When the inquiry information 2:3 is received from the fifth transmission apparatus NE5, since the inquiry information is output from the second transmission apparatus NE2, the second transmission apparatus NE2 determines that a clock loop occurs in the connection destination port of the fourth transmission apparatus NE4. In other words, the second transmission apparatus NE2 recognizes that a clock loop occurs among the second transmission apparatus NE2, the fourth transmission apparatus NE4, and the fifth transmission apparatus NE5.

Figure 15:
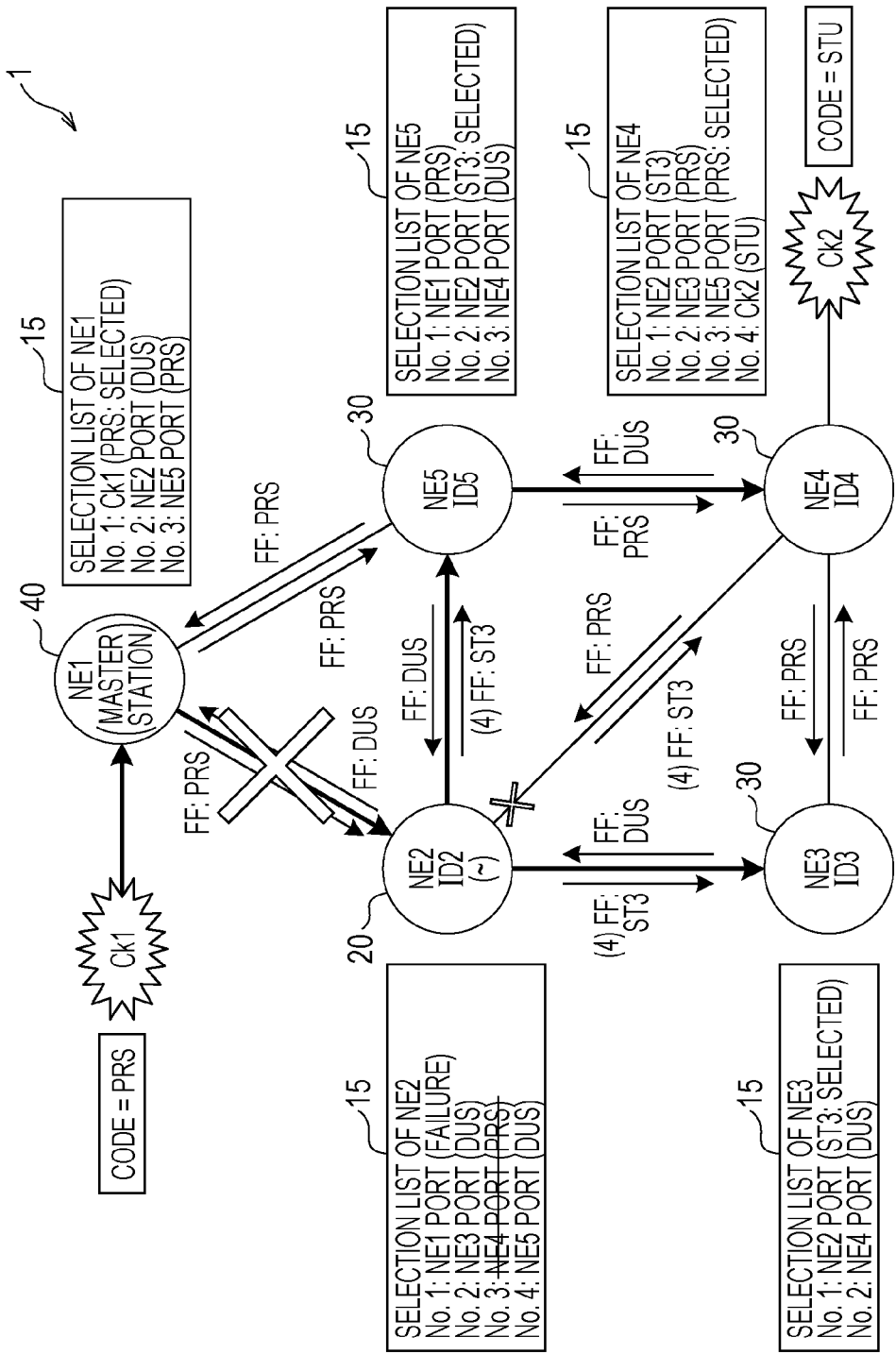
FIG. 15 is a diagram illustrating an example of a process operation of each transmission apparatus in relation to a normal state, failure occurrence, clock free-running, and clock recovery in the transmission system.
Figure 16:
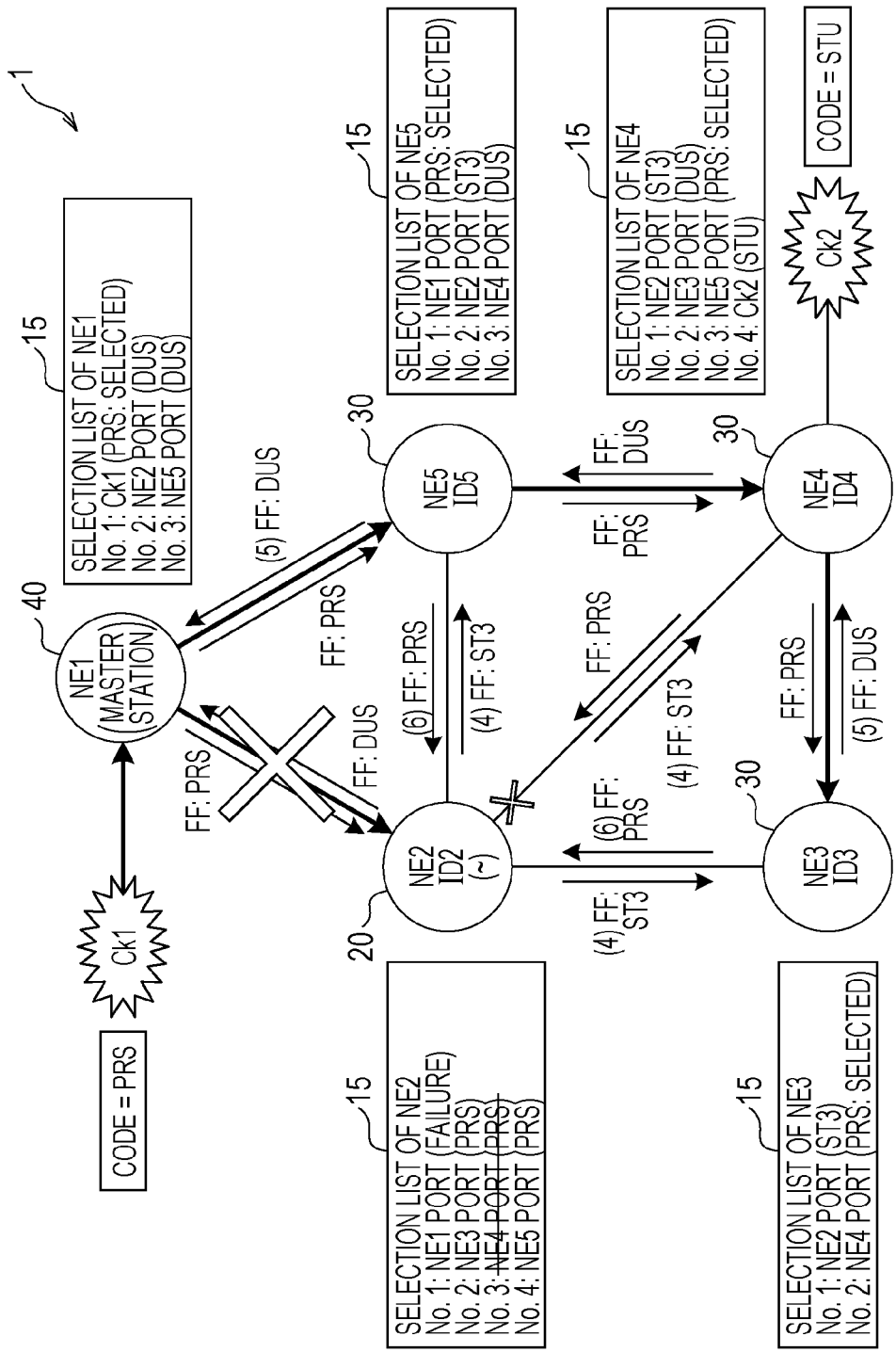
FIG. 16 is a diagram illustrating an example of a process operation of each transmission apparatus in relation to a normal state, failure occurrence, clock free-running, and clock recovery in the transmission system.

The second transmission apparatus NE2 illustrated in FIG. 15 deletes the connection destination port of the fourth transmission apparatus NE4 from the selection list 15 since it is determined that the clock loop occurs in the connection destination port of the fourth transmission apparatus NE4. In addition, the second transmission apparatus NE2 refers to the selection list 15 and selects "free running" as a fixed oscillator of the transmission apparatus NE since the connection destination port of the fifth transmission apparatus NE5 having the fourth priority order has "DUS" and thus there is no selectable connection destination port in the selection list 15.

As a result, the third transmission apparatus NE3 updates "PRS" to "ST3" in a state in which the connection destination port of the second transmission apparatus NE2 having the first priority order in the selection list 15 is selected. In addition, the fourth transmission apparatus NE4 updates quality of the connection destination port of the second transmission apparatus NE2 having the first priority order in the selection list 15, from "PRS" to "ST3". Further, the fifth transmission apparatus NE5 updates "PRS" to "ST3" in a state in which the connection destination port of the second transmission apparatus NE2 having the second priority order in the selection list 15 is selected.

The third transmission apparatus NE3 and the fifth transmission apparatus NE5 update "PRS" to "ST3" in a state in which the connection destination port of the second transmission apparatus NE2 is selected, and thus search for a connection destination port having quality higher than that "ST3" in the selection list 15. As a result, the fifth transmission apparatus NE5 illustrated in FIG. 16 functions as the switching station 20, selects the connection destination port of the first transmission apparatus NE1 having "PRS" and the first priority order, and updates the connection destination port of the first transmission apparatus NE1 in the selection list 15 in a state in which the first transmission apparatus NE1 is selected. The third transmission apparatus NE3 also functions as the switching station 20, selects the connection destination port of the fourth transmission apparatus NE4 having "PRS" and the second priority order, and updates the connection destination port of the fourth transmission apparatus NE4 in a state in which the fourth transmission apparatus NE4 in the selection list 15 is selected.

The fifth transmission apparatus NE5 updates quality of the connection destination port of the first transmission apparatus NE1 to "PRS" and thus transmits "DUS" to the first transmission apparatus NE1. As a result, the first transmission apparatus NE1 updates quality of the connection destination port of the fifth transmission apparatus NE5 having the third priority order in the selection list 15, from "PRS" to "DUS".

In addition, the third transmission apparatus NE3 updates quality of the connection destination port of the fourth transmission apparatus NE4 to "PRS" and thus transmits "DUS" to the fourth transmission apparatus NE4. As a result, the fourth transmission apparatus NE4 updates quality of the connection destination port of the third transmission apparatus NE3 having the second priority order in the selection list 15, from "PRS" to "DUS".

Figure 17:
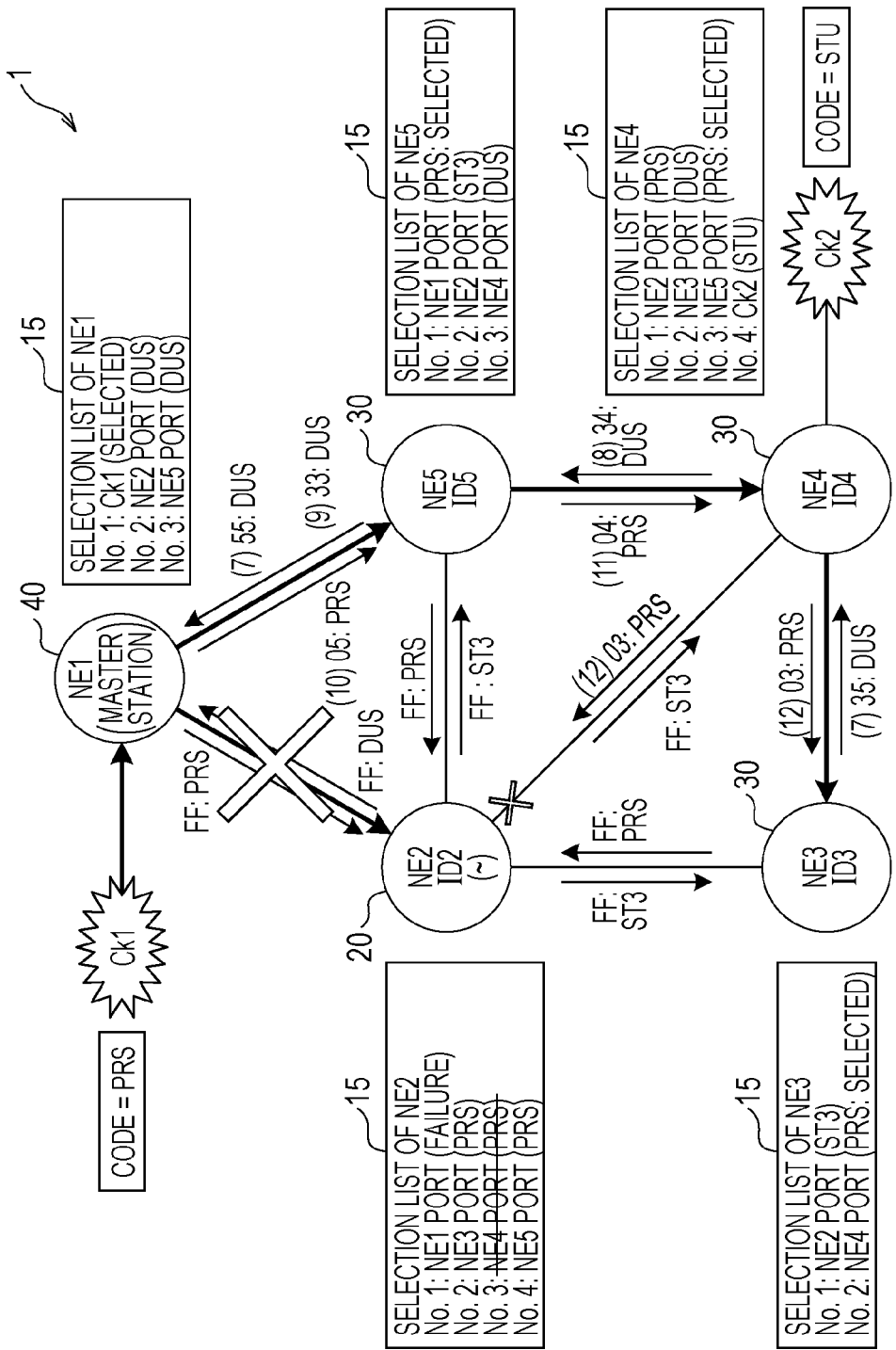
FIG. 17 is a diagram illustrating an example of a process operation of each transmission apparatus in relation to a normal state, failure occurrence, clock free-running, and clock recovery in the transmission system.

When switching to and selection of the connection destination port of the fourth transmission apparatus NE4 are detected, the third transmission apparatus NE3 illustrated in FIG. 17 functions as the switching station 20 and outputs inquiry information 3:5 to the fourth transmission apparatus NE4. When the inquiry information 3:5 is received, the fourth transmission apparatus NE4 transmits the inquiry information 3:4 to the connection destination port of the fifth transmission apparatus NE5 which is currently being selected. In addition, the fourth transmission apparatus NE4 records a reception record of the connection destination port of the third transmission apparatus NE3 which has sent the inquiry information in the information management portion 16. Further, when the inquiry information 3:4 is received, the fifth transmission apparatus NE5 transmits inquiry information 3:3 to the connection destination port of the first transmission apparatus NE1 which is currently being selected. Still further, the fifth transmission apparatus NE5 records a reception record of the connection destination port of the fourth transmission apparatus NE4 which has sent the inquiry information in the information management portion 16.

When the inquiry information 3:3 is received, the first transmission apparatus NE1 is included in the master station 40 and thus records a reception record of the connection destination port of the fifth transmission apparatus NE5 which has sent the inquiry information in the information management portion 16. The first transmission apparatus NE1 outputs master response information 0:5 corresponding to the inquiry information to the fifth transmission apparatus NE5 based on the reception record. In addition, the fifth transmission apparatus NE5 transmits master response information 0:4 to the fourth transmission apparatus NE4 based on the reception record. Further, the fourth transmission apparatus NE4 transmits master response information 0:3 to the third transmission apparatus NE3 based on the reception record. In a case where the master response information 0:3 corresponding to the inquiry information 3:5 is received, the third transmission apparatus NE3 determines that a clock loop does not occur. The third transmission apparatus NE3 determines the connection destination port of the fourth transmission apparatus NE4 in which the clock loop does not occur, as a connection destination port receiving a synchronization clock.

In a case where switching to the connection destination port of the first transmission apparatus NE1 is detected, the fifth transmission apparatus NE5 functions as the switching station 20 and outputs inquiry information 5:5 to the first transmission apparatus NE1. When the inquiry information 5:5 is received, the first transmission apparatus NE1 is included in the master station 40 and thus outputs master response information 0:5 to the fifth transmission apparatus NE5. In a case where the master response information 0:5 corresponding to the inquiry information 5:5 is received, the fifth transmission apparatus NE5 determines that a clock loop does not occur. The fifth transmission apparatus NE5 determines the connection destination port of the first transmission apparatus NE1 in which the clock loop does not occur, as a connection destination port receiving a synchronization clock.

The first transmission apparatus NE1 receives the inquiry information from the fourth transmission apparatus NE4 and the inquiry information from the fifth transmission apparatus NE5, and thus outputs a total of two pieces of master response information which respectively correspond to the respective pieces of inquiry information. However, in a case where the fifth transmission apparatus NE5 receives the master response information from the first transmission apparatus NE1, the reception record of the connection destination port at which the inquiry information is received is deleted, and thus the second master response information is discarded.

Although the fourth transmission apparatus NE4 also receives the inquiry information from the second transmission apparatus NE2, the master response information is received from the master station 40 before the response timer times out, and thus the fourth transmission apparatus NE4 transmits the master response information to the second transmission apparatus NE2. However, the second transmission apparatus NE2 is in a state of waiting for the master response information and thus discards the master response information. The fourth transmission apparatus NE4 discards the master response information sent to the connection destination port of the third transmission apparatus NE3 from the reception record of the connection destination port at which the inquiry information is received. The third transmission apparatus NE3 receives the master response information from the connection destination port of the fourth transmission apparatus NE4 to which the inquiry information has been output, and thus finishes the series of process operations.

Figure 18:
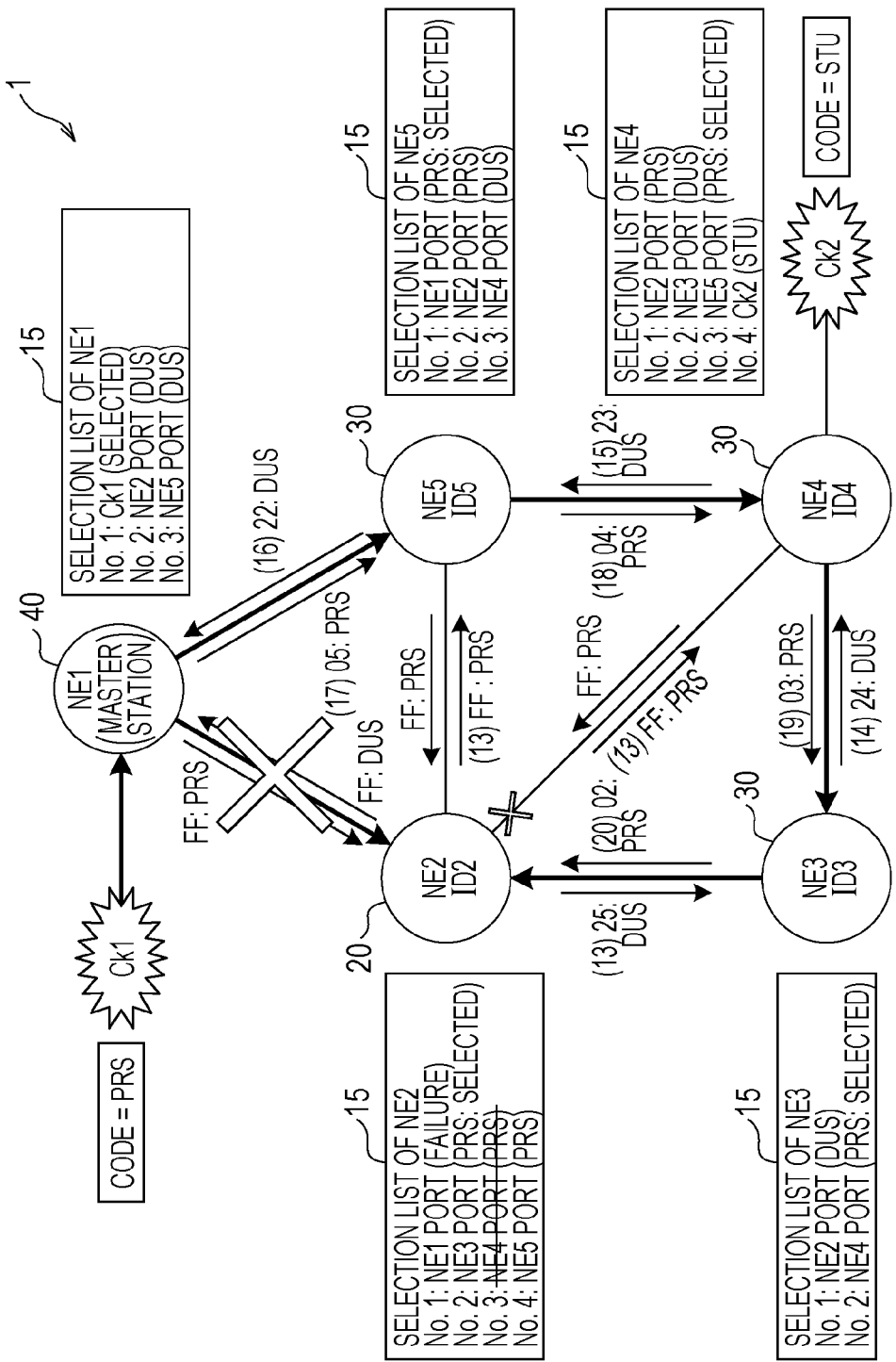
FIG. 18 is a diagram illustrating an example of a process operation of each transmission apparatus in relation to a normal state, failure occurrence, clock free-running, and clock recovery in the transmission system.

Further, the second transmission apparatus NE2 illustrated in FIG. 18 searches the selection list 15 for a connection destination port of the transmission apparatus NE which has quality higher than "ST3" of the fixed oscillator which is currently being selected, in response to the transmission of "DUS" from the third transmission apparatus NE3 and the fifth transmission apparatus NE5. In addition, the selection list 15 of the second transmission apparatus NE2 includes the third transmission apparatus NE3 having "PRS".

The second transmission apparatus NE2 refers to the selection list 15 and selects the connection destination port of the third transmission apparatus NE3 having "PRS" and the second priority order. At this time, in a case where the connection destination port of the third transmission apparatus NE3 is selected, the second transmission apparatus NE2 transmits "DUS" to the third transmission apparatus NE3. In addition, in a case where switching to the connection destination port of the third transmission apparatus NE3 is detected, the second transmission apparatus NE2 functions as the switching station 20 and outputs inquiry information 2:5 addressed to the master station 40. When "DUS" is received from the second transmission apparatus NE2, the third transmission apparatus NE3 updates "PRS" of the connection destination port of the second transmission apparatus NE2 having the first priority order in the selection list 15, to "DUS".

When the inquiry information 2:5 is received from the second transmission apparatus NE2, the third transmission apparatus NE3 transmits the inquiry information 2:4 in which the lifetime information is updated as described above, to the fourth transmission apparatus NE4. In addition, when the inquiry information 2:4 is received from the third transmission apparatus NE3, the fourth transmission apparatus NE4 transmits the inquiry information 2:3 in which the lifetime information is updated, to the fifth transmission apparatus NE5. When the inquiry information 2:3 is received from the fourth transmission apparatus NE4, the fifth transmission apparatus NE5 transmits the inquiry information 2:2 in which the lifetime information is updated, to the first transmission apparatus NE1.

Next, the first transmission apparatus NE1 outputs master response information 0:5 corresponding to the inquiry information 2:2 to the fifth transmission apparatus NE5. When the master response information 0:5 is received from the first transmission apparatus NE1, the fifth transmission apparatus NE5 transmits the master response information 0:4 in which the lifetime information is updated, to the fourth transmission apparatus NE4. When the master response information 0:4 is received from the fifth transmission apparatus NE5, the fourth transmission apparatus NE4 transmits the master response information 0:3 in which the lifetime information is updated, to the third transmission apparatus NE3. When the master response information 0:3 is received from the fourth transmission apparatus NE4, the third transmission apparatus NE3 transmits the master response information 0:2 in which the lifetime information is updated, to the second transmission apparatus NE2. The second transmission apparatus NE2 receives the master response information 0:2 corresponding to the inquiry information 2:5 from the third transmission apparatus NE3 and thus determines that a clock loop does not occur.

Figure 19:
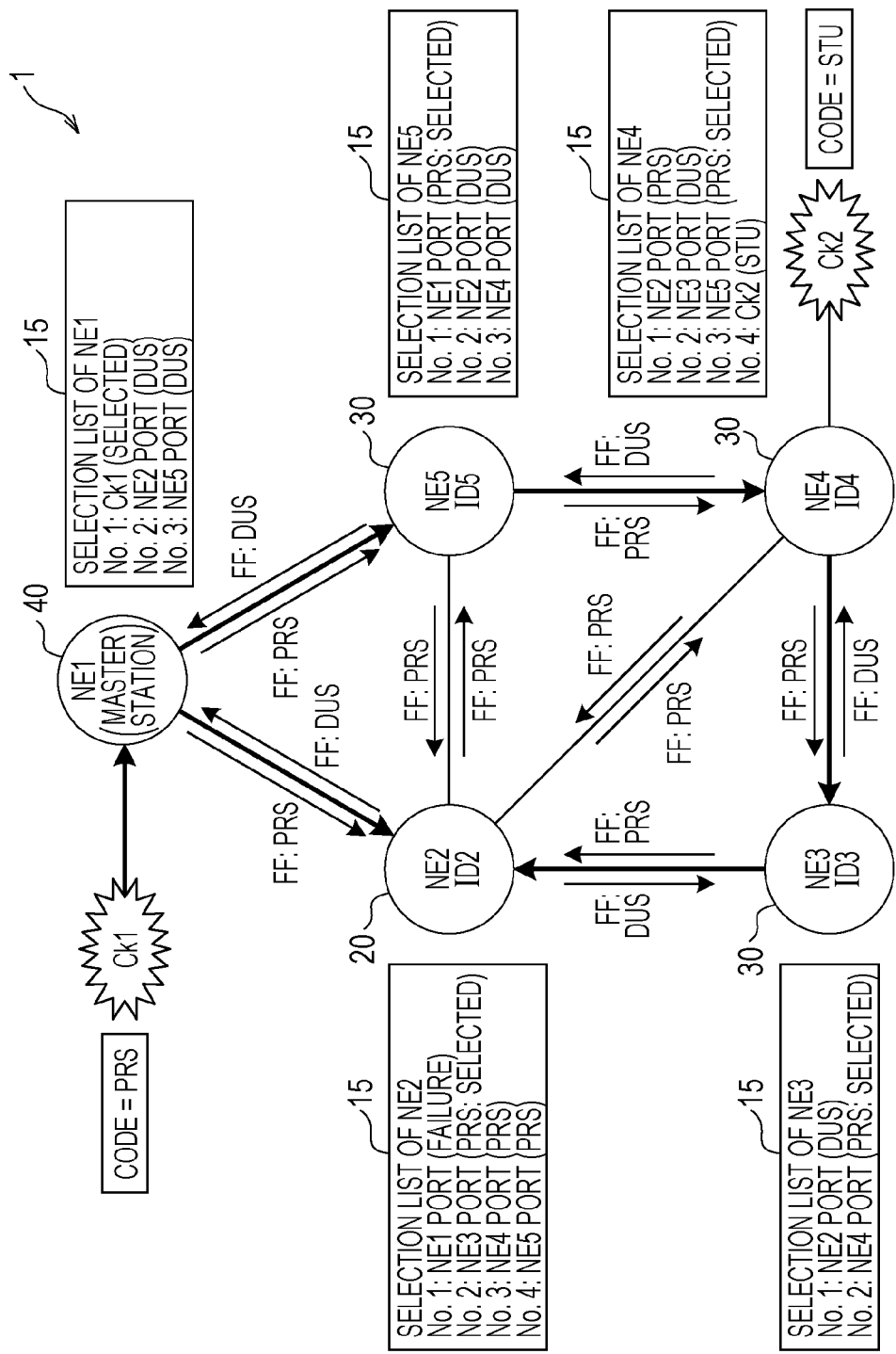
FIG. 19 is a diagram illustrating an example of a process operation of each transmission apparatus in relation to a normal state, failure occurrence, clock free-running, and clock recovery in the transmission system.

In a case where it is determined that a clock loop does not occur, the second transmission apparatus NE2 determines the connection destination port of the third transmission apparatus NE3 as a connection destination port receiving a synchronization clock. In addition, as illustrated in FIG. 19, the second transmission apparatus NE2 recovers the connection destination port of the fourth transmission apparatus NE4 which has been deleted, to the selection list 15. Also in a case where master response information is received from the connection destination port of the fourth transmission apparatus NE4, the second transmission apparatus NE2 discards the master response information since the fourth transmission apparatus NE4 does not correspond to the connection destination port which is currently being selected.

The transmission apparatus NE illustrated in FIGS. 13 to 18 refers to the selection list 15, and selects switching to the fixed oscillator of the transmission apparatus NE in a case where there is no selectable connection destination port in the selection list 15.

In a case where switching to the connection destination port of the transmission apparatus NE for selecting a synchronization clock is detected, the transmission apparatus NE determines a connection destination port receiving a synchronization clock while checking whether or not a clock loop occurs. However, even if switching to a connection destination port is not detected, the transmission apparatus NE may pre-check whether or not a clock loop occurs in the connection destination ports in the selection list 15 in a normal state. Therefore, this pre-check process will be described.

Figure 20A:
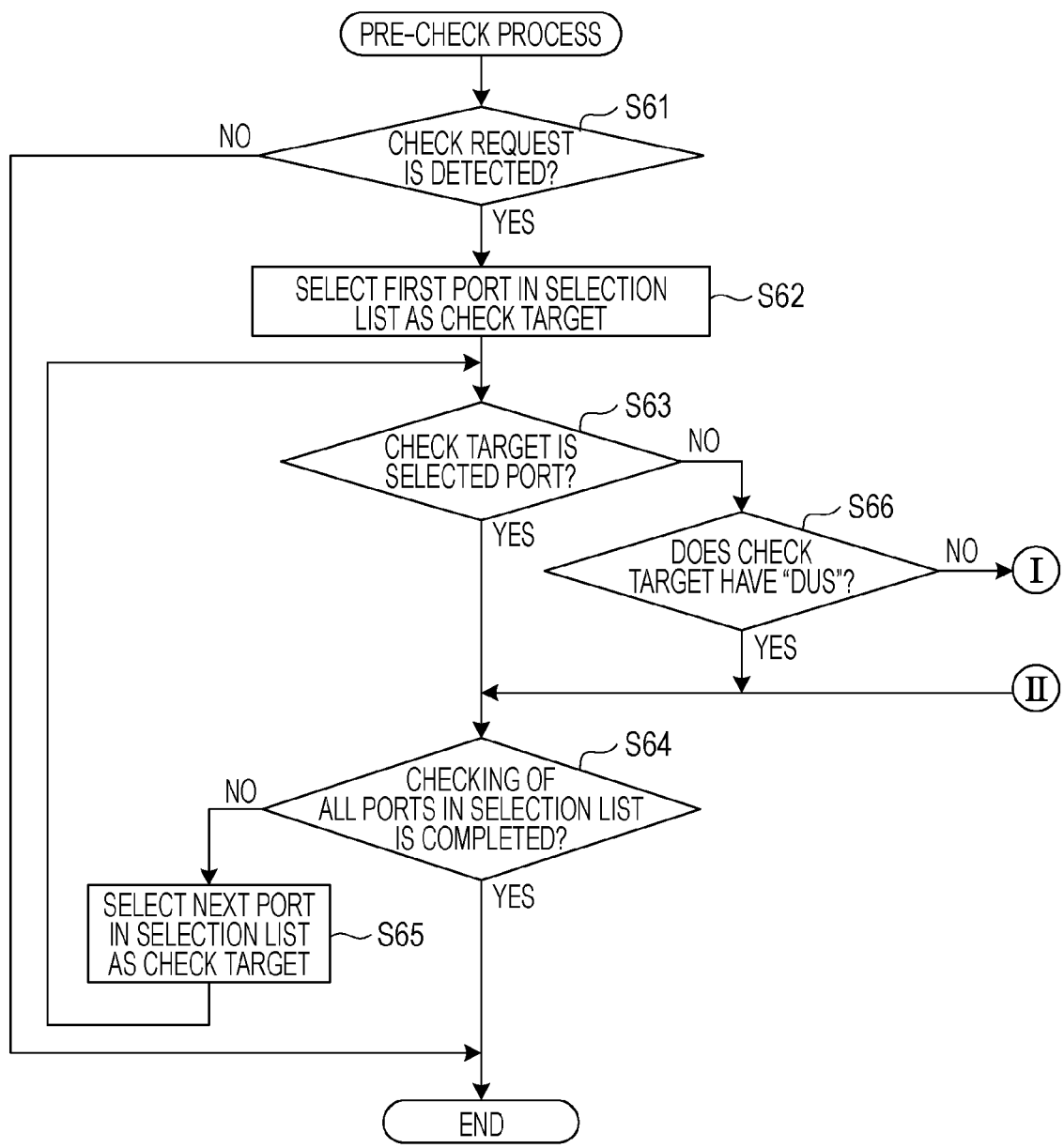

FIGS. 20A and 20B are flowcharts illustrating an example of a process operation of the transmission apparatus NE related to the pre-check process. The pre-check process illustrated in FIGS. 20A and 20B is a process in which each transmission apparatus NE checks whether or not a loop occurs in a connection destination port in the selection list 15 every predetermined timing in a normal state, and updates content of the selection list 15. In FIGS. 20A and 20B, the control unit 14 of the transmission apparatus NE determines whether or not a request for checking the selection list 15 is detected (operation S61). In addition, for example, it is assumed that the check request is periodically made for each predetermined time or is made due to an operator's operation. If the request for checking the selection list 15 is detected (affirmative in operation S61), the control unit 14 selects a connection destination port which is a first check target from the selection list 15 (operation S62).

The control unit 14 determines whether or not the check target connection destination port is a connection destination port which is currently being selected (operation S63). If the check target connection destination port is a connection destination port which is currently being selected (affirmative in operation S63), the control unit 14 determines whether or not checking of all connection destination ports in the selection list 15 is completed (operation S64). If checking of all connection destination ports in the selection list 15 is completed (affirmative in operation S64), the control unit 14 finishes the process operation illustrated in FIGS. 20A and 20B.

If checking of all connection destination ports in the selection list 15 is not completed (negative in operation S64), the control unit 14 selects a connection destination port having the next priority order in the selection list 15 (operation S65). The control unit 14 proceeds to operation S63 so as to determine whether or not the check target connection destination port is a connection destination port which is currently being selected.

The control unit 14 determines whether or not the check target connection destination port has "DUS" (operation S66). If the check target connection destination port has "DUS" (affirmative in operation S66), the control unit 14 excludes the connection destination port from check targets, and proceeds to operation S64 so as to determine whether or not checking of all of the connection destination ports in the selection list 15 is completed.

If the check target connection destination port does not have "DUS" (negative in operation S66), the control unit 14 outputs inquiry information addressed to a master station, to the check target connection destination port (operation S67).

The control unit 14 outputs the inquiry information to the check target connection destination port and then starts a response timer (operation S68). After starting the response timer, the control unit 14 determines whether or not master response information corresponding to the inquiry information is received (operation S69). If the master response information is received (affirmative in operation S69), the control unit 14 determines whether or not there is a connection destination port which has been temporarily deleted from the selection list 15 (operation S70). If there is a connection destination port which has been temporarily deleted from the selection list 15 (affirmative in operation S70), the control unit 14 recovers the deleted connection destination port to the selection list 15 (operation S71). The control unit 14 proceeds to operation S64 so as to determine whether or not checking of all of the connection destination ports in the selection list 15 is completed.

If there is no connection destination port which has been temporarily deleted from the selection list 15 (negative in operation S70), the control unit 14 proceeds to operation S64 so as to determine whether or not checking of all of the connection destination ports in the selection list 15 is completed.

If master response information is not received (negative in operation S69), the control unit 14 determines whether or not inquiry information sent from the transmission apparatus NE is received (operation S72). If the inquiry information sent from the transmission apparatus NE is received (affirmative in operation S72), the control unit 14 determines whether or not a clock loop occurs in the check target connection destination port having received the inquiry information (operation S73).

The control unit 14 temporarily deletes the check target connection destination port in which the clock loop occurs from the selection list 15 (operation S74) and proceeds to operation S64 so as to determine whether or not checking of all of the connection destination ports in the selection list 15 is completed.

The control unit 14 determines whether or not the response timer times out started in operation S68 (operation S75). If the response timer times out (affirmative in operation S75), the control unit 14 proceeds to operation S64 so as to determine whether or not checking of all of the connection destination ports in the selection list 15 is completed. If the response timer does not time out (negative in operation S75), the control unit 14 proceeds to operation S69 so as to determine whether or not master response information is received. In addition, if the check request is not detected (negative in operation S61), the control unit 14 finishes the process operation illustrated in FIGS. 20A and 20B.

If the check request is detected, the transmission apparatus NE which performs the pre-check process illustrated in FIGS. 20A and 20B selects a connection destination port having the priority order in the selection list 15 as check targets, and outputs inquiry information addressed to the master station 40, to the selected connection destination port. In a case where inquiry information sent from the transmission apparatus NE is received, the transmission apparatus NE determines that a clock loop occurs in the check target connection destination port, and deletes the connection destination port from the selection list 15 so as to update the selection list 15. As a result, the transmission apparatus NE can pre-check determines whether or not a clock loop occurs in a connection destination port in the selection list 15 so as to update content of the selection list 15.

In a case where master response information corresponding to inquiry information sent to a selected connection destination port is received, the transmission apparatus NE may determine that the check target connection destination port is in a normal state, and recover a deleted port to the selection list 15 so as to update the selection list 15. As a result, the transmission apparatus NE can pre-check whether or not a clock loop occurs in a connection destination port in the selection list 15 and update the content of the selection list 15.

Figure 21:
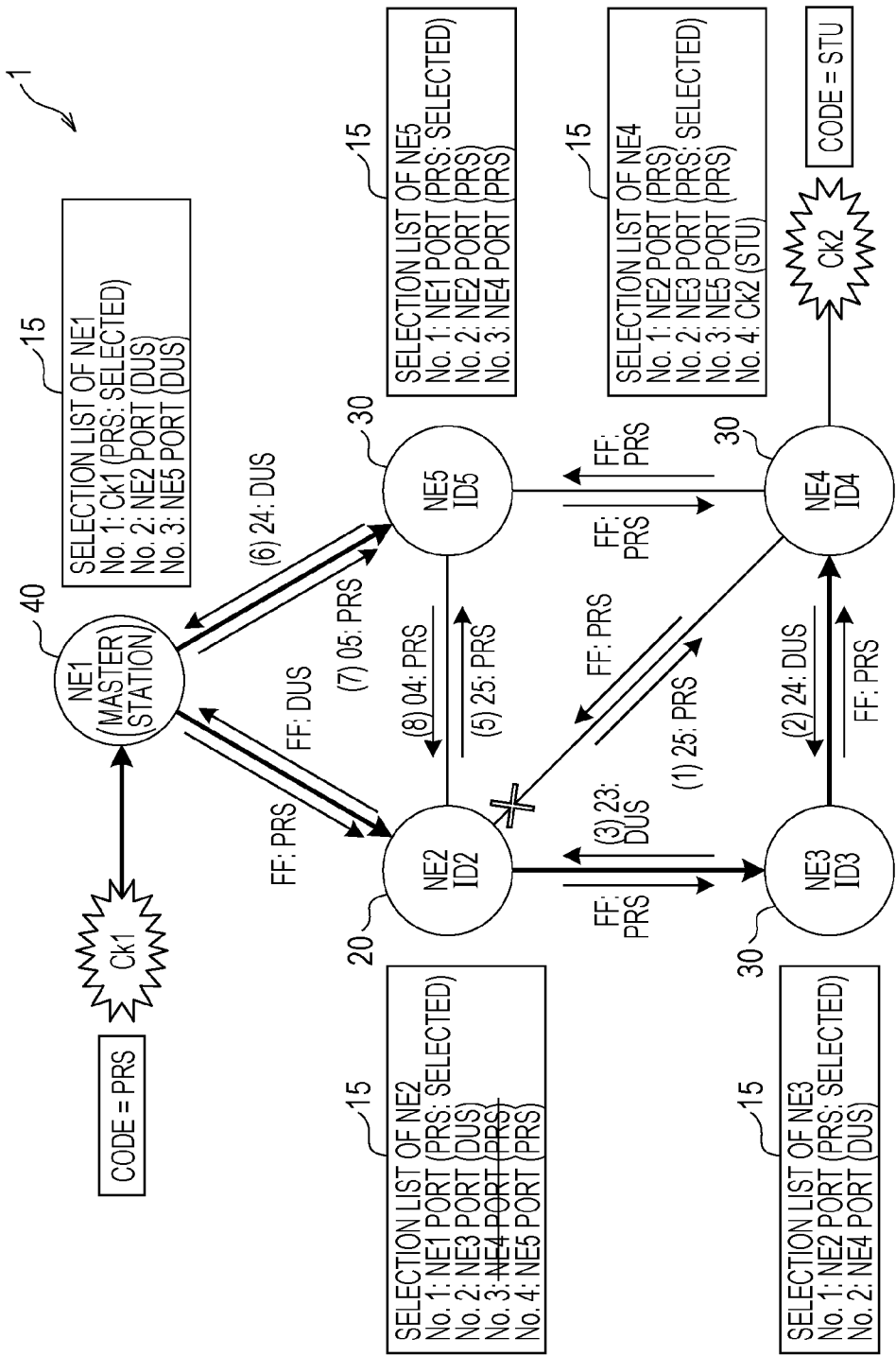
FIG. 21 is a diagram illustrating an example of a process operation related to a pre-check process by a second transmission apparatus in the transmission system.

FIG. 21 is a diagram illustrating an example of a process operation related to a pre-check process of the second transmission apparatus NE2 in the transmission system 1. For convenience of description, the selection list 15 of each transmission apparatus NE in the transmission system 1, illustrated in FIG. 21, is assumed to have the same content as that of the selection list 15 of each transmission apparatus NE illustrated in FIG. 1 as described above.

It is assumed that the second transmission apparatus NE2 illustrated in FIG. 21 detects a check request in a state in which the connection destination port of the first transmission apparatus NE1 having the first priority order in the selection list 15 is selected. The second transmission apparatus NE2 is currently selecting the connection destination port of the first transmission apparatus NE1 having the first priority order in the selection list 15 having "PRS" and has checked that a clock loop does not occur in the connection destination port of the first transmission apparatus NE1. Therefore, the second transmission apparatus NE2 excludes the connection destination port of the first transmission apparatus NE1 which is currently being selected, from output targets of inquiry information.

Next, the connection destination port of the third transmission apparatus NE3 having the second priority order in the selection list 15 is set as a check target, but the third transmission apparatus NE3 has "DUS", and thus the second transmission apparatus NE2 excludes the connection destination port of the third transmission apparatus NE3 from output targets of inquiry information.

In addition, the connection destination port of the fourth transmission apparatus NE4 having the third priority order in the selection list 15 is set as a check target, and the fourth transmission apparatus NE4 has "PRS", and thus the second transmission apparatus NE2 outputs inquiry information 2:5 to the fourth transmission apparatus NE4. In addition, the second transmission apparatus NE2 receives inquiry information 2:3 sent therefrom via the fourth transmission apparatus NE4 and the third transmission apparatus NE3. As a result, the second transmission apparatus NE2 determines that there is the occurrence of a clock loop of the fourth transmission apparatus NE4, the third transmission apparatus NE3, and the second transmission apparatus NE2, and temporarily deletes the connection destination port of the fourth transmission apparatus NE4 in which the clock loop occurs from the selection list 15.

In addition, the connection destination port of the fifth transmission apparatus NE5 having the fourth priority order in the selection list 15 is set as a check target, and the fifth transmission apparatus NE5 has "PRS", and thus the second transmission apparatus NE2 outputs inquiry information 2:5 to the fifth transmission apparatus NE5. In addition, the second transmission apparatus NE2 receives inquiry information 2:4 sent therefrom via the fifth transmission apparatus NE5 and the first transmission apparatus NE1. As a result, the fifth transmission apparatus NE5 transmits the inquiry information 2:4 from the second transmission apparatus NE2, to the first transmission apparatus NE1 which is included in the master station 40. The first transmission apparatus NE1 which is included in the master station 40 outputs master response information 0:5 corresponding to the inquiry information 2:4 to the second transmission apparatus NE2 via the fifth transmission apparatus NE5. In a case where the master response information 0:4 is received from the fifth transmission apparatus NE5, the second transmission apparatus NE2 determines that a clock loop does not occur in the connection destination port. In addition, since checking of all of the connection destination ports in the selection list 15 is completed, the second transmission apparatus NE2 recovers the deleted connection destination port of the fourth transmission apparatus NE4 having the third priority order to the selection list 15 so as to update the content of the selection list 15. As a result, even if a failure or the like does not occur, the second transmission apparatus NE2 can pre-check whether or not a clock loop occurs in a selectable connection destination port in the selection list 15 so as to update the content of the selection list 15.

Figure 22:
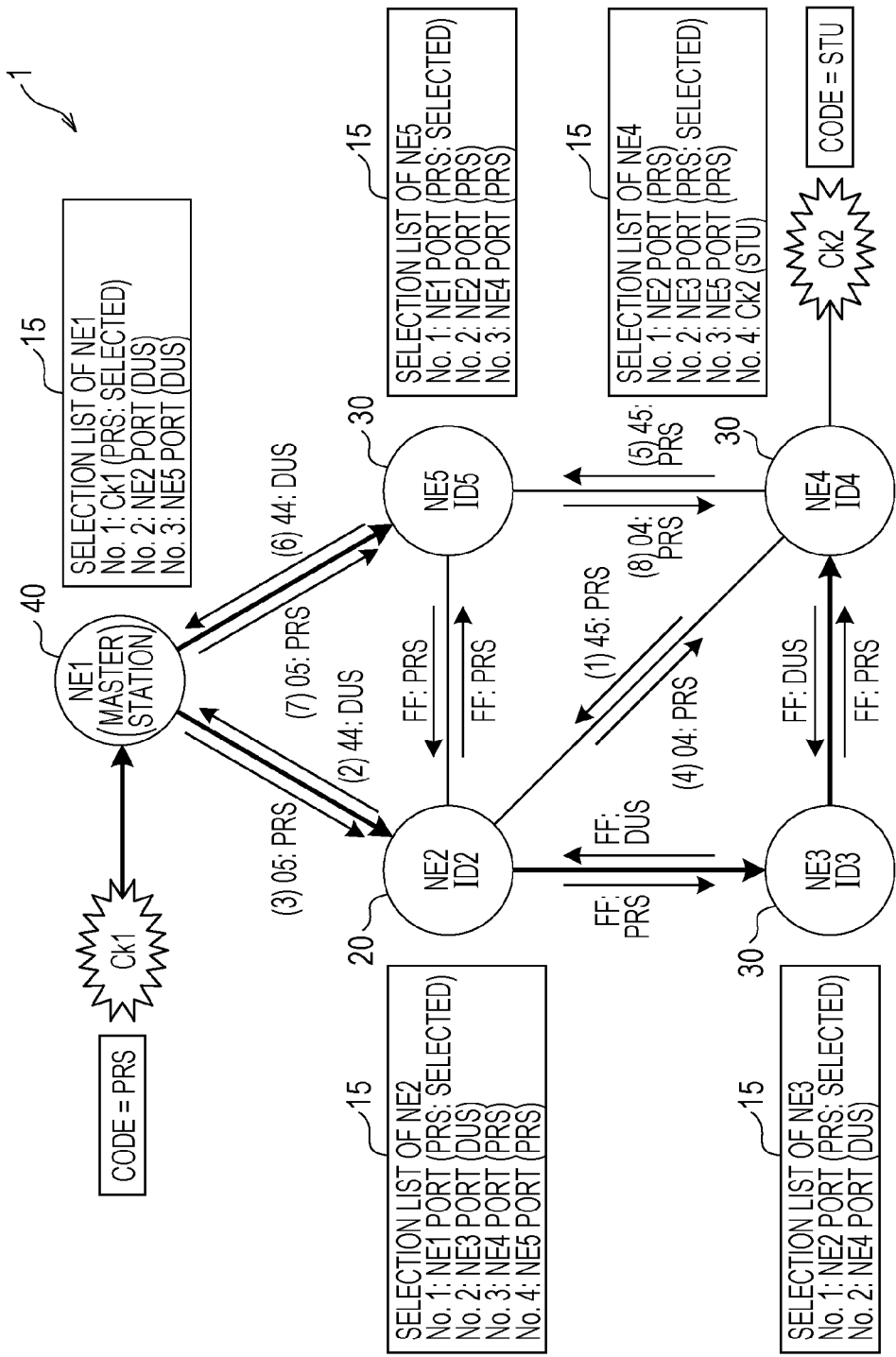
FIG. 22 is a diagram illustrating an example of a process operation related to a pre-check process by a fourth transmission apparatus in the transmission system.

FIG. 22 is a diagram illustrating an example of a process operation related to a pre-check process of the fourth transmission apparatus NE4 in the transmission system 1. In a case where a check request is detected, the fourth transmission apparatus NE4 illustrated in FIG. 22 is currently selecting the connection destination port of the third transmission apparatus NE3 having the second priority order and "PRS" in the selection list 15. The fourth transmission apparatus NE4 has checked that a clock loop does not occur in the connection destination port of the third transmission apparatus NE3. The fourth transmission apparatus NE4 excludes the connection destination port of the third transmission apparatus NE3 which is currently being selected, from output targets of inquiry information.

In addition, the connection destination port of the second transmission apparatus NE2 having the first priority order in the selection list 15 is set as a check target, and the connection destination port of the second transmission apparatus NE2 has "PRS", and thus the fourth transmission apparatus NE4 outputs inquiry information 4:5 to the second transmission apparatus NE2. When the inquiry information 4:5 is received, the second transmission apparatus NE2 transmits the inquiry information 4:4 from the fourth transmission apparatus NE4 to the first transmission apparatus NE1 which is included in the master station 40. The first transmission apparatus NE1 outputs master response information 0:5 corresponding to the inquiry information 4:4 to the second transmission apparatus NE2. When the master response information 0:5 is received, the second transmission apparatus NE2 transmits the master response information 0:4 to the fourth transmission apparatus NE4. When the master response information 0:4 is received from the second transmission apparatus NE2, the fourth transmission apparatus NE4 determines that the connection destination port of the second transmission apparatus NE2 is a connection destination port in which a clock loop does not occur.

Next, the connection destination port of the fifth transmission apparatus NE5 having the third priority order in the selection list 15 is set as a check target, and the fifth transmission apparatus NE5 has "PRS", and thus the fourth transmission apparatus NE4 outputs inquiry information 4:5 to the fifth transmission apparatus NE5. When the inquiry information 4:5 is received from the fourth transmission apparatus NE4, the fifth transmission apparatus NE5 transmits the inquiry information 4:4 to the first transmission apparatus NE1. When the inquiry information 4:4 is received, the first transmission apparatus NE1 which is included in the master station 40 outputs master response information 0:5 corresponding to the inquiry information 4:4 to the fifth transmission apparatus NE5. When the master response information 0:5 is received, the fifth transmission apparatus NE5 transmits the master response information 0:4 to the fourth transmission apparatus NE4. When the master response information 0:4 is received from the fifth transmission apparatus NE5, the fourth transmission apparatus NE4 determines that the connection destination port of the fifth transmission apparatus NE5 is a connection destination port in which a clock loop does not occur.

In addition, the fourth transmission apparatus NE4 excludes the second clock source Ck2 (STU) having the fourth priority order in the selection list 15 from output targets of inquiry information. Further, the fourth transmission apparatus NE4 updates the content of the selection list 15. As a result, even if a failure or the like does not occur, the fourth transmission apparatus NE4 can pre-check whether or not a clock loop occurs in a selectable connection destination port in the selection list 15 so as to update the content of the selection list 15.

Figure 23:
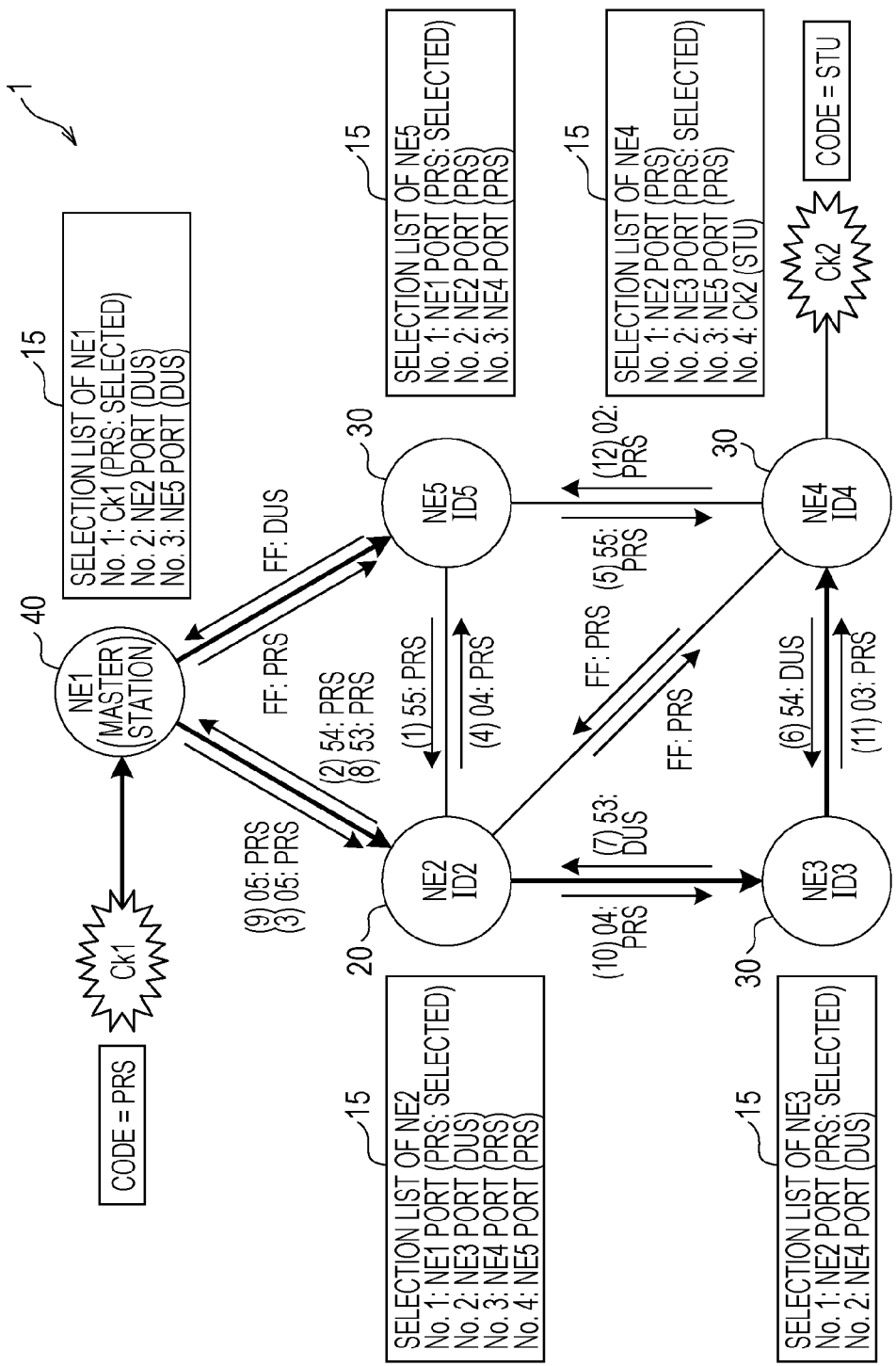
FIG. 23 is a diagram illustrating an example of a process operation related to a pre-check process by a fifth transmission apparatus in the transmission system.

FIG. 23 is a diagram illustrating an example of a process operation related to a pre-check process of the fifth transmission apparatus NE5 in the transmission system 1. In a case where a check request is detected, the fifth transmission apparatus NE5 illustrated in FIG. 23 is currently selecting the connection destination port of the first transmission apparatus NE1 having the first priority order in the selection list 15 and "PRS". The fifth transmission apparatus NE5 has checked that a clock loop does not occur in the connection destination port of the first transmission apparatus NE1. Thus, the fifth transmission apparatus NE5 excludes the connection destination port of the first transmission apparatus NE1 which is currently being selected, from output targets of inquiry information.

Next, the connection destination port of the second transmission apparatus NE2 having the second priority order in the selection list 15 is set as a check target, and the second transmission apparatus NE2 has "PRS", and thus the fifth transmission apparatus NE5 outputs inquiry information 5:5 to the second transmission apparatus NE2. The second transmission apparatus NE2 transmits the inquiry information 5:4 to the first transmission apparatus NE1 which is included in the master station 40. The first transmission apparatus NE1 outputs master response information 0:5 corresponding to the inquiry information 5:4 to the second transmission apparatus NE2. When the master response information 0:5 is received, the second transmission apparatus NE2 transmits the master response information 0:4 to the fifth transmission apparatus NE5. When the master response information 0:4 is received from the second transmission apparatus NE2, the fifth transmission apparatus NE5 determines that the connection destination port of the second transmission apparatus NE2 is a connection destination port in which a clock loop does not occur.

Next, the connection destination port of the fourth transmission apparatus NE4 having the third priority order in the selection list 15 is set as a check target, and the fourth transmission apparatus NE4 has "PRS", and thus the fifth transmission apparatus NE5 outputs inquiry information 5:5 to the fourth transmission apparatus NE4. When the inquiry information 5:5 is received, the fourth transmission apparatus NE4 transmits the inquiry information 5:4 to the third transmission apparatus NE3. When the inquiry information 5:4 is received, the third transmission apparatus NE3 transmits the inquiry information 5:3 to the second transmission apparatus NE2. When the inquiry information 5:3 is received, the second transmission apparatus NE2 transmits the inquiry information 5:2 to the first transmission apparatus NE1.

When the inquiry information 5:2 is received from the second transmission apparatus NE2, the first transmission apparatus NE1 transmits master response information 0:5 corresponding to the inquiry information 5:2 to the second transmission apparatus NE2. When the master response information 0:5 is received, the second transmission apparatus NE2 transmits the master response information 0:4 to the third transmission apparatus NE3. When the master response information 0:4 is received, the third transmission apparatus NE3 transmits the master response information 0:3 to the fourth transmission apparatus NE4. Further, when the master response information 0:3 is received, the fourth transmission apparatus NE4 transmits the master response information 0:2 to the fifth transmission apparatus NE5. When the master response information 0:2 is received from the fourth transmission apparatus NE4, the fifth transmission apparatus NE5 determines that the connection destination port of the fourth transmission apparatus NE4 is a connection destination port in which a clock loop does not occur. In addition, the fifth transmission apparatus NE5 updates the content of the selection list 15. As a result, even if a failure or the like does not occur, the fifth transmission apparatus NE5 can pre-check whether or not a clock loop occurs in a selectable connection destination port in the selection list 15 so as to update the content of the selection list 15.

The first transmission apparatus NE1 does not output inquiry information to the connection destination ports of the other transmission apparatuses NE since all the other connection destination ports have "DUS" except for the first clock source Ck1 in the selection list 15.

The transmission apparatus NE checks whether or not a clock loop occurs in a connection destination port in the selection list 15 even in a normal state regardless of the occurrence of switching to a connection destination port, and performs an adjustment operation of temporarily deleting a connection destination port in which a clock loop occurs from the selection list 15. As a result, it is possible to minimize the occurrence of a clock loop. In addition, the transmission apparatus NE temporarily deletes a connection destination port in which a clock loop occurs from the selection list 15, but may lower a priority order instead of the temporary deletion.

In a case where switching to a connection destination port receiving a synchronization clock is detected, the transmission apparatus NE of the present example checks whether or not a clock loop occurs in each connection destination port by referring to the selection list 15, and determines a connection destination port in which a clock loop does not occur, as the connection destination port receiving a synchronization clock. As a result, it is possible to minimize the occurrence of a clock loop.

In the transmission system 1, it is possible to minimize the occurrence of a clock loop even in a synchronous communication network having a complex mesh configuration, and to search for a connection destination port in which the clock loop does not occur. As a result, it is possible to minimize deterioration in signal quality.

In a case where a clock loop occurs in a connection destination port, the transmission apparatus NE temporarily deletes the connection destination port from the selection list 15, and thus it is possible to minimize selection of the connection destination port in which the clock loop occurs.

Even if a failure or the like does not occur, the transmission apparatus NE checks a state of a connection destination port in the selection list 15 in a normal state, pre-checks a connection destination port in which a clock loop occurs, and updates content of the selection list 15 based on the check result. As a result, it is possible to minimize the occurrence of a clock loop when a connection destination port is switched and thus to minimize deterioration in clock quality.

In a case where inquiry information is received from the switching station 20, the transmission apparatus NE records a transmission apparatus NE which is a connection destination having sent the inquiry information. The transmission apparatus NE transmits the inquiry information to a transmission apparatus NE which is a connection destination which is currently being selected. As a result, the transmission apparatus NE can transmit the inquiry information to another transmission apparatus NE. In addition, when master response information corresponding to the inquiry information is received, the transmission apparatus NE transmits the master response information to the transmission apparatus NE which is a recorded connection destination. As a result, the transmission apparatus NE can transmit the master response information corresponding to the inquiry information to another transmission apparatus NE.

In addition, in the above-described present example, the Sonet/SDH network is exemplified, and inquiry information or master response information is inserted into the S1 byte region of the overhead of a transmission signal. However, for example, an Ethernet network may be used, and inquiry information or master response information may be inserted into a "Reserved" area of a frame format defined in ITU-T G.8264.

Each illustrated constituent element of the respective units may not be physically configured as illustrated. In other words, a specific form of distribution or integration of the respective units is not limited to ones illustrated, and all or some of the respective units can be arbitrarily configured through functional or physical distribution or integration depending on various loads, use circumstances, or the like.

All or arbitrary some of the various process functions, corresponding to the control unit 14 of FIG. 2, performed by the respective devices may be executed by a central processing unit (CPU) (or a microcomputer such as a micro processing unit (MPU) or a micro controller unit (MCU)). In addition, all or arbitrary some of the various process functions may be executed on a program which is interpreted and executed by the CPU (or a microcomputer such as the MPU or the MCU), or on hardware using wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A transmission system comprising:
    a first transmission apparatus configured to distribute a synchronization clock, the first transmission apparatus including:
        a first control circuit configured to select a clock source or a second transmission apparatus of a connection destination so as to switch the synchronization clock, wherein the first transmission apparatus generates a response signal to an inquiry signal and wherein the second transmission apparatus is one of one or more second transmission apparatuses; and
    the second transmission apparatuses being configured to connect to the first transmission apparatus and synchronize with the synchronization clock from the first transmission apparatus, the second transmission apparatus including:
        a selection circuit configured to select the first transmission apparatus or the second transmission apparatus of a connection destination so as to switch the synchronization clock;
        an output circuit configured to generate the inquiry signal addressed to the first transmission apparatus via the second transmission apparatus of the connection destination selected by the selection circuit;
        a determination circuit configured to determine whether or not the inquiry signal generated by the second transmission apparatus is received; and
        a second control circuit configured to determine that there is a synchronization clock loop having a loop path through the second transmission apparatus of the connection destination selected by the selection circuit when the determination circuit determines the inquiry signal is received by the first transmission apparatus or the second transmission apparatus of the one or more second transmission apparatuses selected by the selection circuit based on the response signal transmitted from the first transmission apparatus.

2. The transmission system according to claim 1, wherein, when the response signal to the inquiry signal is received from the first transmission apparatus, the second control circuit determines a path to the first transmission apparatus or the second transmission apparatus of the connection destination selected by the selection circuit, as a reception path of the synchronization clock.

3. The transmission system according to claim 1, wherein:
    the second transmission apparatus further includes a storage circuit configured to store an identifier of the first transmission apparatus or the second transmission apparatus of the connection destination for priority order,
    the selection circuit selects the first transmission apparatus or the second transmission apparatus of the connection destination based on the priority order in the storage circuit, and
    when the second control circuit determines that there is the synchronization clock loop including a path having the second transmission apparatus of the connection destination selected by the selection circuit, the second control circuit deletes the identifier of the second transmission apparatus of the connection destination from the storage circuit.

4. The transmission system according to claim 3,
    wherein the storage circuit stores the identifier of the first or second transmission apparatus of the connection destination and a synchronization status message (SSM) set to the first or second transmission apparatus of the connection destination for priority order, and
    wherein the selection circuit selects the first transmission apparatus or the second transmission apparatus of the connection destination based on the priority order and the SSM.

5. The transmission system according to claim 1,
    wherein the second transmission apparatus further includes
    a transmission circuit configured to record an identifier of another second transmission apparatus, of the one or more second transmission apparatuses of a connection destination having received the inquiry signal when the inquiry signal is received from the another second transmission apparatus, transmit the inquiry signal to the first transmission apparatus or the second transmission apparatus of a connection destination selected by the selection circuit, and transmit the response signal to the second transmission apparatus of the recorded connection destination when the response signal corresponding to the inquiry signal is received.

6. The transmission system according to claim 3,
    wherein, when a predetermined signal is detected, the selection circuit selects the first transmission apparatus or the second transmission apparatus of the connection destination based on the priority order in the storage circuit.

7. A transmission apparatus subordinately synchronized with a synchronization clock from a master station to distribute the synchronization clock, the transmission apparatus comprising:
    a selection circuit configured to select a transmission apparatus of a connection destination so as to switch the synchronization clock of the master station;
    an output circuit configured to generate an inquiry signal addressed to the master station via the transmission apparatus of the connection destination selected by the selection circuit;
    a determination circuit configured to determine whether or not the inquiry signal, generated by the output circuit, is received; and
    a control circuit configured to determine that there is a synchronization clock loop having a loop path through the transmission apparatus of the connection destination when the determination circuit determines that the inquiry signal is received by the transmission apparatus, selected by the selection circuit, based on a response signal transmitted from the master station.

8. The transmission apparatus according to claim 7,
    wherein, when the response signal to the inquiry signal is received from the master station, the control circuit determines a path to the transmission apparatus of the connection destination selected by the selection circuit as a reception path of the synchronization clock.

9. The transmission apparatus according to claim 7, further comprising:

a storage circuit configured to store identification information for identifying the transmission apparatus of the connection destination and a synchronization status message set to the transmission apparatus of the connection destination for priority order, wherein the selection circuit selects the transmission apparatus of the connection destination based on the priority order in the storage circuit, and wherein, when the control circuit determines that there is the synchronization clock loop including a path having the transmission apparatus of the connection destination selected by the selection circuit, the control circuit deletes the identification information for identifying the transmission apparatus, selected by the selection circuit, of the connection destination from the storage circuit.

10. The transmission apparatus according to claim 7, further comprising:

a transmission circuit configured to, when the inquiry signal is received from the another transmission apparatus of the connection destination, selected by the selection circuit, record identification information for identifying the another transmission apparatus of the connection destination, selected by the selection circuit, having received the inquiry signal, transmit the inquiry signal to the another transmission apparatus of the connection destination, selected by the selection circuit, and transmit the response signal to the another transmission apparatus of the recorded connection destination, selected by the selection circuit, when the response signal corresponding to the inquiry signal is received.

11. A clock synchronization method for a transmission system including a first transmission apparatus configured to distribute a synchronization clock, and one or more second transmission apparatuses each configured to connect to the first transmission apparatus and to synchronize with the synchronization clock from the first transmission apparatus, the clock synchronization method comprising:

selecting the first transmission apparatus or a second transmission apparatus, of the one or more second transmission apparatuses, of a connection destination so as to switch the synchronization clock of the first transmission apparatus;

generating an inquiry signal addressed to the first transmission apparatus and outputting the inquiry signal to the first transmission apparatus via the second transmission apparatus of the selected first transmission apparatus or the selected second transmission apparatus of the connection destination;

determining whether or not the inquiry signal output by the second transmission apparatus is received; and determining that there is a synchronization clock loop having a loop path through the selected second transmission apparatus of the connection destination when the inquiry signal is received, by the second transmission apparatus.

* * * * *